US008813561B2

(12) United States Patent
Kataoka

(10) Patent No.: US 8,813,561 B2
(45) Date of Patent: Aug. 26, 2014

(54) LIQUID LEVEL DETECTING DEVICE AND FUEL TANK STRUCTURE

(75) Inventor: Chiaki Kataoka, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/878,165

(22) PCT Filed: Feb. 9, 2012

(86) PCT No.: PCT/JP2012/052998
§ 371 (c)(1),
(2), (4) Date: Apr. 5, 2013

(87) PCT Pub. No.: WO2013/118281
PCT Pub. Date: Aug. 15, 2013

(65) Prior Publication Data
US 2013/0248525 A1   Sep. 26, 2013

(51) Int. Cl.
*G01F 23/26* (2006.01)
*B60K 15/03* (2006.01)

(52) U.S. Cl.
CPC ............... *G01F 23/26* (2013.01); *B60K 15/03* (2013.01); *G01F 23/268* (2013.01); *G01F 23/263* (2013.01)
USPC ...................................... 73/304 C

(58) Field of Classification Search
USPC ...................................... 73/304 C
See application file for complete search history.

(56) References Cited

U.S. PATENT DOCUMENTS

| | | | | |
|---|---|---|---|---|
| 2,700,901 A * | 2/1955 | Rickner | .................. | 73/304 C |
| 3,216,255 A * | 11/1965 | McFarlane | .................. | 73/290 R |
| 3,337,789 A * | 8/1967 | Naoya et al. | .................. | 363/100 |
| 4,051,431 A * | 9/1977 | Wurster | .................. | 73/861 |
| 5,001,596 A | 3/1991 | Hart | | |
| 5,028,875 A * | 7/1991 | Peters | .................. | 324/660 |
| 5,122,922 A * | 6/1992 | Richeson | .................. | 361/284 |
| 5,144,835 A * | 9/1992 | McDonald | .................. | 73/304 C |
| 5,537,109 A * | 7/1996 | Dowd | .................. | 340/870.37 |
| 6,490,920 B1 * | 12/2002 | Netzer | .................. | 73/304 C |
| 6,641,240 B2 * | 11/2003 | Hsu et al. | .................. | 347/7 |
| 6,734,686 B2 * | 5/2004 | Lin et al. | .................. | 324/663 |
| 7,258,005 B2 * | 8/2007 | Nyce | .................. | 73/304 C |
| 7,432,725 B2 * | 10/2008 | Sieh et al. | .................. | 324/662 |
| 2003/0159506 A1 * | 8/2003 | Brutschin et al. | .................. | 73/290 V |
| 2005/0172712 A1 * | 8/2005 | Nyce | .................. | 73/304 C |
| 2005/0252290 A1 * | 11/2005 | Eguchi et al. | .................. | 73/304 R |
| 2007/0076024 A1 | 4/2007 | Jeong et al. | | |
| 2011/0120219 A1 * | 5/2011 | Barlesi et al. | .................. | 73/304 |

FOREIGN PATENT DOCUMENTS

| | | |
|---|---|---|
| EP | 0478069 A1 | 4/1992 |
| JP | 2007-218861 A | 8/2007 |
| JP | 2008-524618 A | 7/2008 |
| JP | 2009-210503 A | 9/2009 |

* cited by examiner

*Primary Examiner* — Hezron E Williams
*Assistant Examiner* — Mark A Shabman
(74) *Attorney, Agent, or Firm* — Gifford, Krass, Sprinkle, Anderson & Citkowski, P.C.

(57) ABSTRACT

A liquid level detecting device and a fuel tank structure are obtained that do not require provision of plural, independent detection electrodes.
A liquid level detecting device 40 has a pair of electrode plates (42, 44), and has a first detection electrode (70A) that detects electrostatic capacitance between the pair of electrode plates, and a variable structure (60) that can vary a surface area of an overlapping region of the pair of electrode plates (42, 44) and can switch to a second detection electrode (70B) by changing the surface area by a predetermined amount with respect to the first detection electrode (70A).

6 Claims, 29 Drawing Sheets

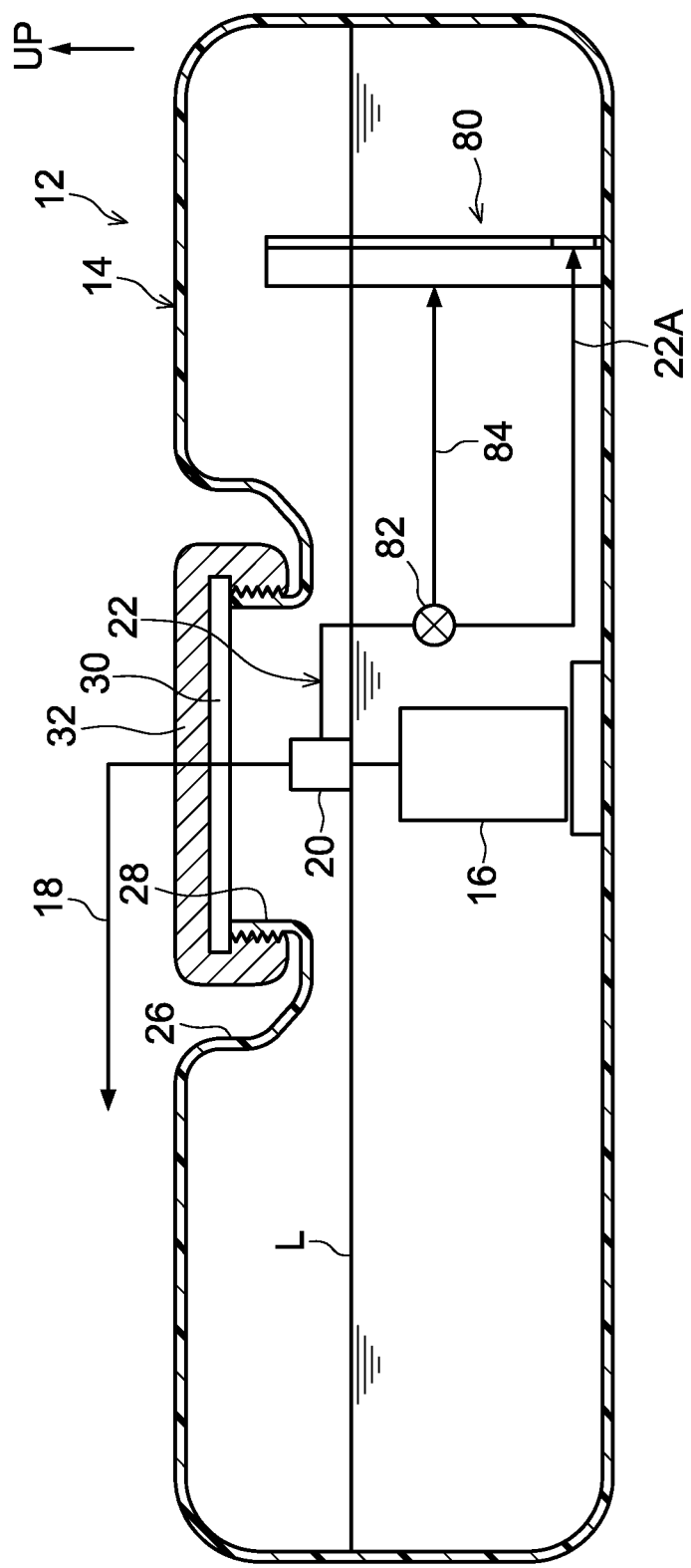

LIQUID LEVEL DETECTING DEVICE AND FUEL TANK STRUCTURE

TECHNICAL FIELD

The present invention relates to a liquid level detecting device and a fuel tank structure.

BACKGROUND ART

A liquid level sensor in which a first detection electrode and a second detection electrode are provided at a resistor substrate is disclosed in Patent Document 1 (Japanese Patent Application Laid-Open No. 2009-210503) for example. In this liquid level sensor, the liquid level is detected from the electrostatic capacitance detected at the first detection electrode and the electrostatic capacitance detected at the second detection electrode.

[Patent Document 1] Japanese Patent Application Laid-Open No. 2009-210503
[Patent Document 2] Japanese Patent Application Laid-Open No. 2007-218861
[Patent Document 3] Japanese Patent Application Laid-Open No. 2008-524618

DISCLOSURE OF INVENTION

Technical Problem

However, in Patent Document 1 (Japanese Patent Application Laid-Open No. 2009-210503), because the first detection electrode and the second detection electrode are provided independently, plural detection electrodes must be provided in order to detect the liquid level.

In view of the above-described circumstances, an object of the present invention is to provide a liquid level detecting device and a fuel tank structure that do not require the provision of plural, independent detection electrodes.

Solution to Problem

A liquid level detecting device of a first aspect of the present invention has: a pair of electrode plates that are disposed so as to oppose one another, and at which an electrostatic capacitance between the opposing portions is detected; and a variable structure that can vary a surface area of an overlapping region of the pair of electrode plates or a distance between the pair of electrode plates, and that, by changing the surface area or the distance by a predetermined amount, switches between a first detection electrode and a second detection electrode that have different electrode patterns for detecting the electrostatic capacitance.

In a liquid level detecting device of a second aspect of the present invention, in the liquid level detecting device of the first aspect, the variable structure has a driving structure that moves at least one of the pair of electrode plates relatively with respect to the other and switches between the first detection electrode and the second detection electrode.

In a liquid level detecting device of a third aspect of the present invention, in the liquid level detecting device of the second aspect, the driving structure has: an urging member that urges the pair of electrode plates toward a position that configures the first detection electrode; and a liquid transporting mechanism that provides, to one of the pair of electrode plates, a flow of liquid, which moves the one of the pair of electrode plates against an urging force of the urging member.

In a liquid level detecting device of a fourth aspect of the present invention, in the liquid level detecting device of the second aspect or the third aspect, the variable structure has a sliding structure that slides one of the pair of electrode plates with respect to the other along a surface direction of the pair of electrode plates.

In a liquid level detecting device of a fifth aspect of the present invention, in the liquid level detecting device of any one aspect of the first aspect through fourth aspect, the pair of electrode plates are plates made of metal.

A fuel tank structure of a sixth aspect of the present invention has: a fuel tank that accommodates fuel; and the liquid level detecting device of one aspect of the first aspect through the fifth aspect that is provided within the fuel tank and detects a liquid level of the fuel on the basis of at least an electrostatic capacitance detected at the first detection electrode and an electrostatic capacitance detected at the second detection electrode.

In accordance with the liquid level detecting device of the first aspect of the present invention, the pair of electrode plates are provided, and the electrode plates are switched between the first detection electrode and the second detection electrode, that have different electrode patterns for detecting electrostatic capacitance, due to the surface area of the overlapping region between the pair of electrode plates, or the distance between the pair of electrode plates, being changed by a predetermined amount by the variable structure. Further, the respective electrostatic capacitances are detected at the first detection electrode and the second detection electrode, and the liquid level is detected on the basis of the respective electrostatic capacitances. In this liquid level detecting device, because the first detection electrode and the second detection electrode are structured from a common pair of electrode plates, there is no need to provide plural, independent detection electrodes.

In accordance with the liquid level detecting device of the second aspect of the present invention, the variable structure has a driving structure that relatively moves at least one of the pair of electrode plates with respect to the other. By changing the surface area of the overlapping region of the pair of electrode plates, or the distance between the pair of electrode plates, by a predetermined amount by the driving structure, the electrode plates can be switched between the first detection electrode and the second detection electrode.

In accordance with the liquid level detecting device of the third aspect of the present invention, the pair of electrode plates are urged by the urging member toward the position that structures the first detection electrode. Due to a flow of liquid, which moves one of the pair of electrode plates against the urging force of the urging member, being provided to the one of the pair of electrode plates by the liquid transporting mechanism, the one of the pair of electrode plates is moved with respect to the other, and the electrode plates can be switched to the second detection electrode. By using this liquid level detecting device in a fuel tank structure for example, an existing liquid transporting mechanism can be utilized, and there is no need to separately provide a driving structure.

In accordance with the liquid level detecting device of the fourth aspect of the present invention, the variable structure has a sliding structure, and one of the pair of electrode plates is slid, with respect to the other, along the surface direction of the pair of electrode plates. In this sliding structure, because the movable range of the pair of electrode plates is small, compactness of the liquid level detecting device is possible.

In accordance with the liquid level detecting device of the fifth aspect of the present invention, the pair of electrode plates are plates made of metal and there is no need to form electrode wires. Therefore, the electrode plates can be switched between the first detection electrode and the second detection electrode by a simple structure.

In accordance with the fuel tank structure of the sixth aspect of the present invention, the liquid level detecting device of any one aspect of the first aspect through the fifth aspect is provided within a fuel tank that accommodates fuel. The liquid level of the fuel is detected on the basis of at least the electrostatic capacitance detected at the first detection electrode and the electrostatic capacitance detected at the second detection electrode. At this time, because the first detection electrode and the second detection electrode are structured from a common pair of electrode plates, there is no need to provide plural, independent detection electrodes.

Advantageous Effects of Invention

In accordance with the liquid level detecting device and fuel tank structure relating to the present invention, there is no need to provide plural, independent detection electrodes.

BRIEF DESCRIPTION OF DRAWINGS

FIG. 6 is a schematic structural drawing showing a fuel tank structure to which a liquid level detecting device of a second embodiment of the present invention is applied.

BEST MODES FOR CARRYING OUT THE INVENTION

A first embodiment of a liquid level detecting device relating to the present invention is described hereinafter by using FIG. 1 through FIG. 5A. Note that arrow UP shown appropriately in these drawings indicates the device upper side, and arrow LW indicates the device lower side.

Figure 1:
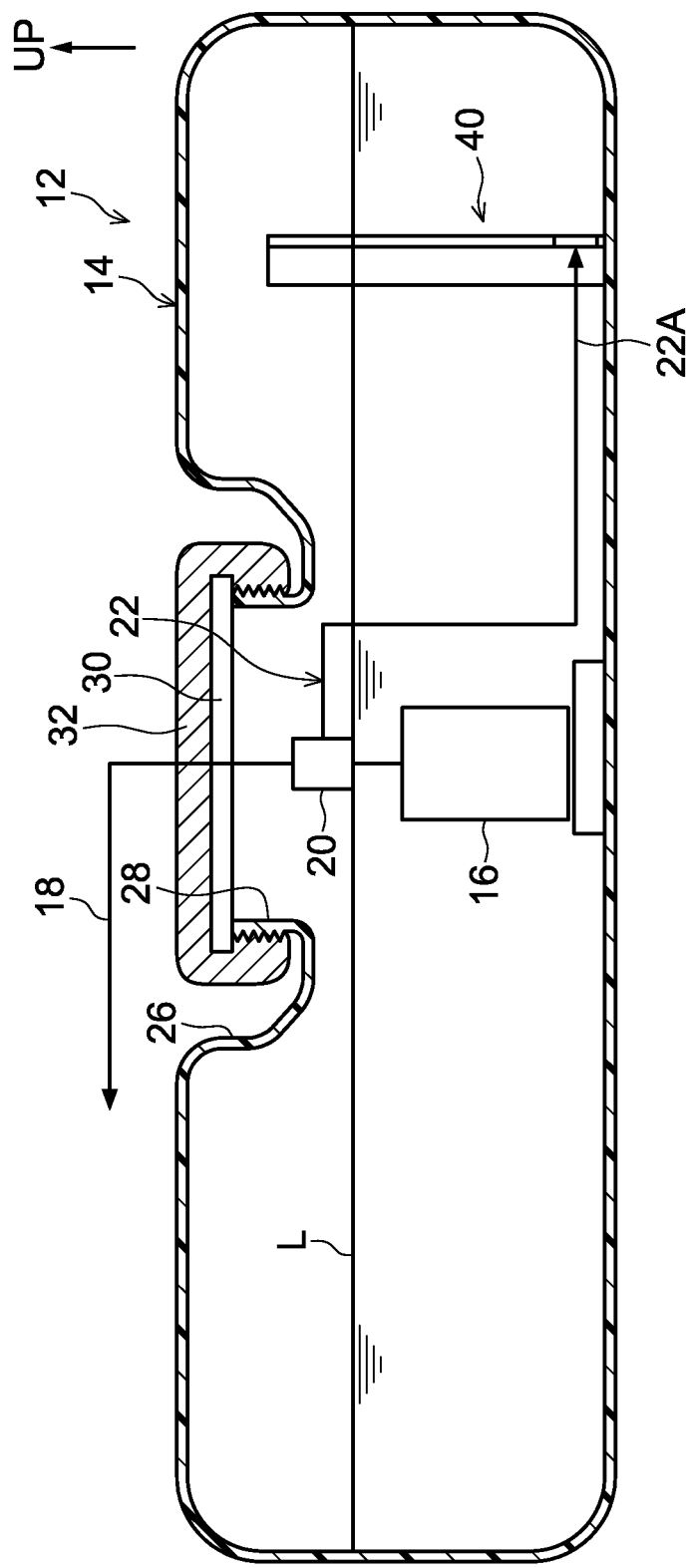
FIG. 1 is a schematic structural drawing showing a fuel tank structure to which a liquid level detecting device of a first embodiment of the present invention is applied.

A fuel tank structure 12, at which a liquid level detecting device 40 of a first embodiment is provided, is shown in FIG. 1. This fuel tank structure 12 has a fuel tank 14 that is disposed beneath a floor panel (not shown) of a vehicle or the like. The fuel tank 14 is formed from a container that is flat vertically as an example, and can accommodate fuel L in the interior thereof. A fuel pump 16 is housed within the fuel tank 14, and due to the fuel pump 16 being driven, the fuel L within the fuel tank 14 is supplied through a fuel supply pipe 18 to an engine (not shown). The liquid level detecting device 40, that detects the liquid level of the fuel L, is provided within the fuel tank 14.

Within the fuel tank 14, a pressure regulator (pressure regulating valve) 20 is mounted midway along the fuel supply pipe 18, and the jetting-out pressure of the fuel L is adjusted. A pipe 22 for pressure return is connected to the pressure regulator 20, and the fuel L is sent-out into the fuel pump 16 through the pipe 22. A distal end 22A, at the ejection direction downstream side of the pipe 22, is disposed so as to be directed toward the lower portion side of the liquid level detecting device 40. The positional relationship between the distal end 22A of the pipe 22 and the liquid level detecting device 40 is described later.

A recess portion 26, whose outer surface is recessed, is formed in the top side surface of the fuel tank 14, and a mounting port 28 that projects-out in a tube shape is provided within the recess portion 26. The mounting port 28 is tightly shut by a cap portion 30, that is closed from the outer side, so that the fuel L at the interior does not leak-out to the exterior. The cap portion 30 is fixed by a threaded cap 32 that screws-together with a nude screw provided at the outer peripheral surface of the mounting port 28.

At this time, when the mounting port 28 projects-out from the top surface of the box-shaped fuel tank 14, there is the concern that the space efficiency at the time of assembly to the lower side of the floor panel of a vehicle or the like will deteriorate, and therefore, it is desirable that the mounting port 28 be provided so as to be sunk-in toward the inner side of the fuel tank 14. The fuel supply pipe 18 is mounted so as to pass through the cap portion 30 and the threaded cap 32.

Figure 2:
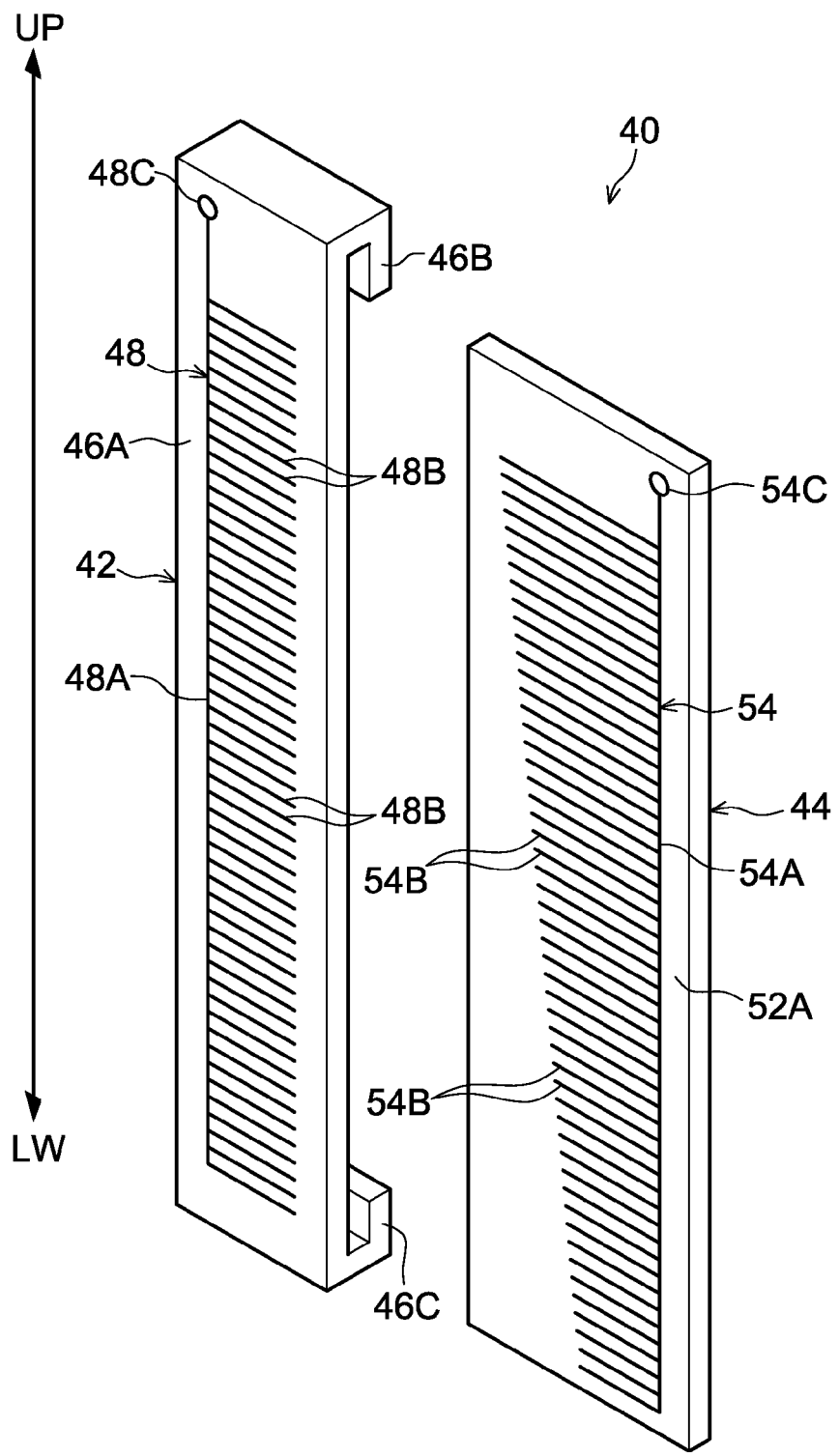
FIG. 2 is an exploded perspective view showing a pair of electrode plates that are used in the liquid level detecting device of the first embodiment of the present invention.
Figure 3A:
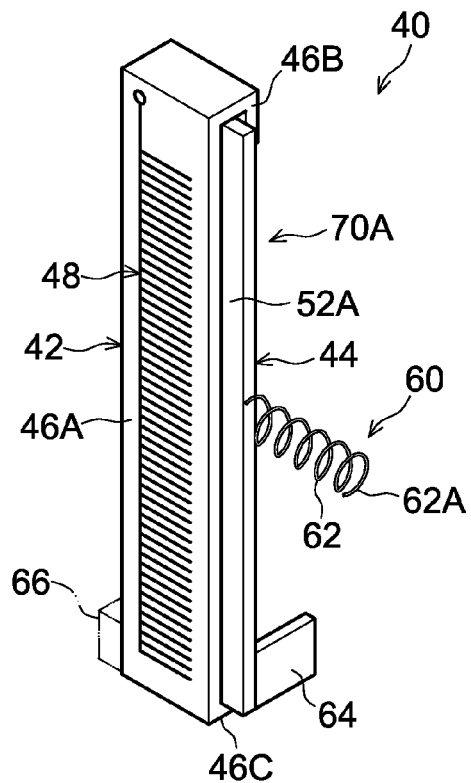
FIG. 3A is a perspective view showing a state in which a first detection electrode is structured by the liquid level detecting device of the first embodiment of the present invention.
Figure 4A:
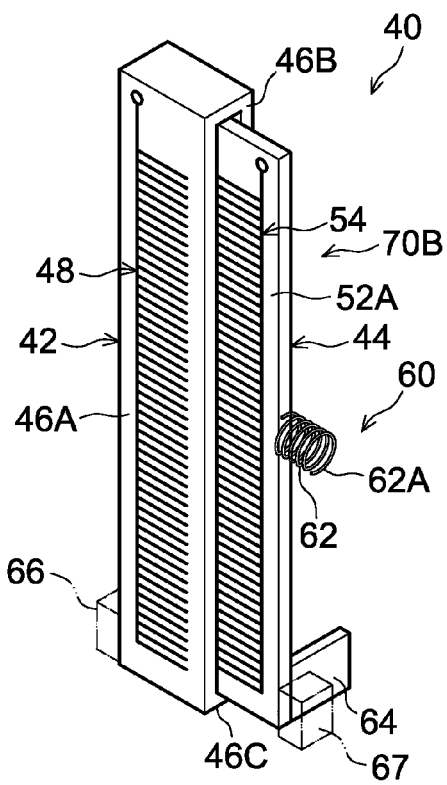
FIG. 4A is a perspective view showing a state in which a second detection electrode is structured by the liquid level detecting device of the first embodiment of the present invention.

As shown in FIG. 2, the liquid level detecting device 40 is provided with a pair of electrode plates 42, 44 (refer to FIG. 3A and FIG. 4A). At the one electrode plate 42, an electrode 48 (+ electrode), that serves as a + electrode of a predetermined pattern, is formed at a substrate 46A that is vertically long and that is formed from a resin such as PPS (polyphenylene sulfide resin) or the like for example. Guides 46B, 46C, that are substantially U-shaped and support the other electrode plate 44 slidably along the surface direction, are provided at the upper end portion and the lower end portion of the substrate 46A. The guides 46B, 46C are formed so as to have up-down symmetry so as to nip-in the upper portion side and the lower portion side of the other electrode plate 44.

The electrode 48 has a rectilinear portion 48A that is disposed substantially along the vertical direction at one side within the plane of the substrate 46A, plural branch portions 48B that are disposed in a substantially perpendicular direction with respect to the rectilinear portion 48A, and an electrode connecting portion 48C that is provided at the top end of the rectilinear portion 48A. The plural branch portions 48B extend from the rectilinear portion 48A in the form of teeth of a comb, and are disposed at predetermined intervals in the vertical direction of the substrate 46A. The lengths of the plural branch portions 48B are set so as to be substantially equal at the upper and lower sides of the substrate 46A.

At the other electrode plate 44, an electrode 54 (− electrode), that serves as a − electrode of a predetermined pattern, is formed at a substrate 52A that is vertically long and that is formed from a resin such as PPS (polyphenylene sulfide resin) or the like for example. The width of the substrate 52A in the lateral direction (the direction orthogonal to the vertical direction) is larger than the width of the substrate 46A in the lateral direction (the direction orthogonal to the vertical direction).

The electrode 54 has a rectilinear portion 54A that is disposed substantially along the vertical direction at one side (a side that is different than the rectilinear portion 48A of the electrode 48) within the plane of the substrate 52A, plural branch portions 54B that are disposed in a substantially perpendicular direction with respect to the rectilinear portion 54A, and an electrode connecting portion 54C that is provided at the top end of the rectilinear portion 54A. The plural branch portions 54B extend from the rectilinear portion 54A in the form of teeth of a comb, and are disposed at predetermined intervals in the vertical direction of the substrate 52A. The lengths of the plural branch portions 54B are set such that the lengths gradually become shorter from the upper side toward the lower side. The plural branch portions 54B, that are at the upper side from slightly at the lower side of the vertical direction intermediate portion of the substrate 52A, are formed to be longer than lengths of the plural branch portions 48B of the one electrode plate 42. The electrode connecting portion 48C at the electrode 48, and the electrode connecting portion 54C at the electrode 54, are electrically connected by, for example, an electrical circuit (not shown) that is provided at the exterior. Detection of electrostatic capacitance and the like are carried out at the electrical circuit.

As shown in FIG. 3A and FIG. 4A, the electrode plate 44 is slidable along the surface direction in a state of being supported by the guides 46B, 46C of the electrode plate 42. Namely, the electrode plate 44 slides in the horizontal direction with respect to the electrode plate 42 that is fixed within the fuel tank 14 (see FIG. 1).

A driving structure 60, that serves as an example of a variable structure that changes the overlapping region (surface area) of the electrode 54 of the electrode plate 44 and the electrode 48 of the electrode plate 42 by sliding the electrode plate 44 by a predetermined amount in a state in which the electrode plate 44 is supported by the guides 46B, 46C of the electrode plate 42, is provided at the liquid level detecting device 40. The driving structure 60 is a structure that changes (switches) the overlapping region (surface area) of the electrode 54 of the electrode plate 44 and the electrode 48 of the electrode plate 42 between a position that structures a first detection electrode 70A that is shown in FIG. 3A, and a position that structures a second detection electrode 70B that is shown in FIG. 4A.

More concretely, the driving structure 60 has, at the side portion, of the substrate 52A of the electrode plate 44, a coil spring 62 that serves as an example of an urging member that urges the electrode plate 44 toward the position structuring the first detection electrode 70A (the side at which the other electrode plate 44 closes), and a receiving surface 64 that is shaped as a plate piece and is disposed in a direction perpendicular to the surface of the substrate 52A at the lower portion of the substrate 52A. A distal end 62A of the coil spring 62 is feed and supported by an unillustrated supporting member, in a state in which a fixed distance is maintained from the side portion of the substrate 46A of the electrode plate 42. A stopper 66, that restricts the movement of the electrode plate 44 due to the urging force of the coil spring 62, is provided at the side portion (the side opposite the coil spring 62) of the substrate 46A of the electrode plate 42.

Figure 5A:
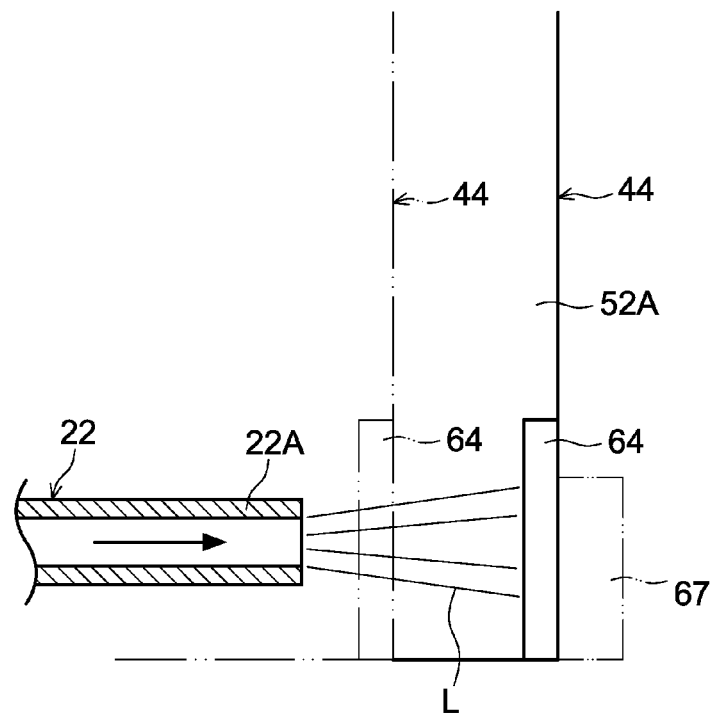
FIG. 5A is a schematic structural drawing showing a driving structure that is used in the liquid level detecting device of the first embodiment of the present invention.

As shown in FIG. 5A, the receiving surface 64 of the electrode plate 44 is disposed at a position facing the distal end 22A that is at the ejecting direction downstream side of the pipe 22. Due to the receiving surface 64 of the electrode plate 44 receiving the return fuel L that is ejected from the distal end 22A of the pipe 22, the electrode plate 44 slides, against the urging force of the coil spring 62, to the position structuring the second detection electrode 70B (see FIG. 4A). A stopper 67, that restricts the sliding range of the electrode plate 44, is provided at a position (the coil spring 62 side) facing the side portion of the substrate 52A of the electrode plate 44. The fuel pump 16 (see FIG. 1) structures a liquid transporting mechanism that provides a flow of fuel (liquid) that moves the electrode plate 44 against the urging force of die coil spring 62.

Figure 3B:
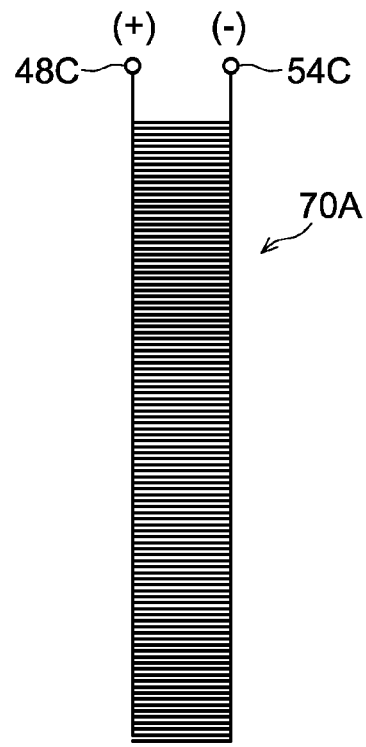
FIG. 3B is a drawing showing an electrode pattern of an overlapping region of the pair of electrode plates at the first detection electrode.
Figure 4B:
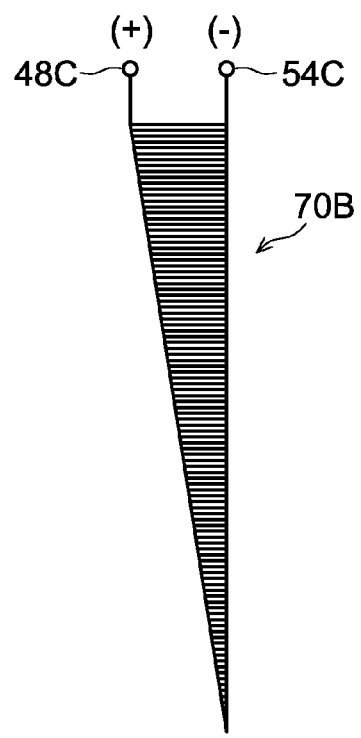
FIG. 4B is a drawing showing an electrode pattern of an overlapping region of the pair of electrode plates at the second detection electrode.

The electrode pattern of the overlapping region of the pair of electrode plates 42, 44 at the first detection electrode 70A (FIG. 3A) is shown in FIG. 3B. The electrode pattern of the overlapping region of the pair of electrode plates 42, 44 at the second detection electrode 70B (FIG. 4A) is shown in FIG. 4B. The pattern is switched between the respective patterns according to the first detection electrode 70A and the second detection electrode 70B, by the other electrode plate 44 being slid by the driving structure 60 by a predetermined amount in the horizontal direction with respect to the one electrode plate 42. At the liquid level detecting device 40, the electrostatic capacitance between the electrodes 48, 54 at the pair of electrode plates 42, 44 fluctuates in accordance with the surface, area of the overlapping region of the electrodes 48, 54, and the lengths of the portions contacting the fuel L in the vertical direction, and the lengths of the portions contacting the air in the vertical direction, and the like. At this time, the liquid level of the fuel L can be detected by the respective electrostatic capacitances being detected from the two patterns that are in accordance with the first detection electrode 70A and the second detection electrode 70B. The method of detecting the liquid level of the fuel L is described later.

At the driving structure 60 of the present embodiment, at the time of idling of the vehicle, there is much return fuel L from the pipe 22, and the other electrode plate 44 moves in the opening direction with respect to the one electrode plate 42, and the second detection electrode 70B is structured. At times when the engine is folly open, i.e., at times of WOT (Wide Open Throttle), there is little return fuel L, the other electrode plate 44 moves in the closing direction with respect to the one electrode plate 42, and the first detection electrode 70A is structured.

Figure 5B:
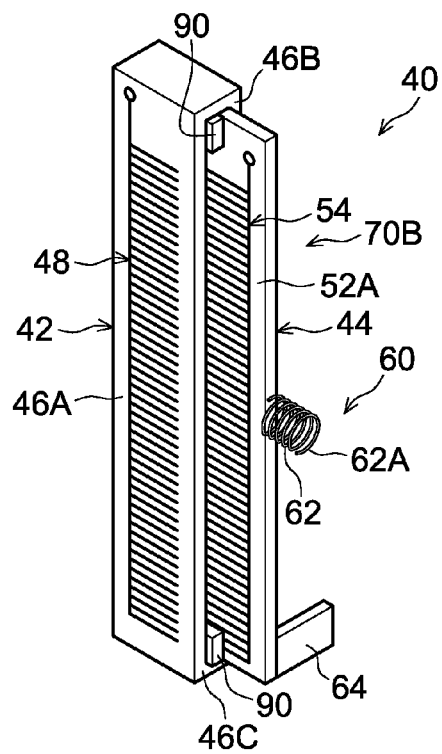
FIG. 5B is a perspective view showing a modified example of the liquid level detecting device of the first embodiment of the present invention.

Further, as shown in FIG. 5B, as a modified example of the liquid level detecting device 40, spacers 90 may be provided at the upper end portion and the lower end portion between the electrode plate 42 and the electrode plate 44, in order to keep the distance between the electrode plate 42 and the electrode plate 44 constant.

A fuel tank structure having a liquid level detecting device 80 of a second embodiment is shown in FIG. 6. As shown in FIG. 6, at the liquid level detecting device 80, a switching valve 82 is provided midway along the pipe 22, and another pipe 84 is connected to the switching valve 82. When the return fuel L is ejected from the pipe 84, the electrode plate 44 of the liquid level detecting device 80 does not operate. Note that the other structures of the liquid level detecting device 80 are the same as the liquid level detecting device 40 of the first embodiment.

In this liquid level detecting device 80, the ejection path of the return fuel can be controlled by the switching of the switching valve 82. Namely, by ejecting the return fuel L from the distal end 22A of the pipe 22 due to the switching of the switching valve 82, the other electrode plate 44 can be slid in the opening direction with respect to the one electrode plate 42 (see FIG. 3A, FIG. 4A).

Next, the method of detecting the liquid level of the fuel L within the fuel tank 14 from the first detection electrode 70A and the second detection electrode 70B is described.

Figure 7:
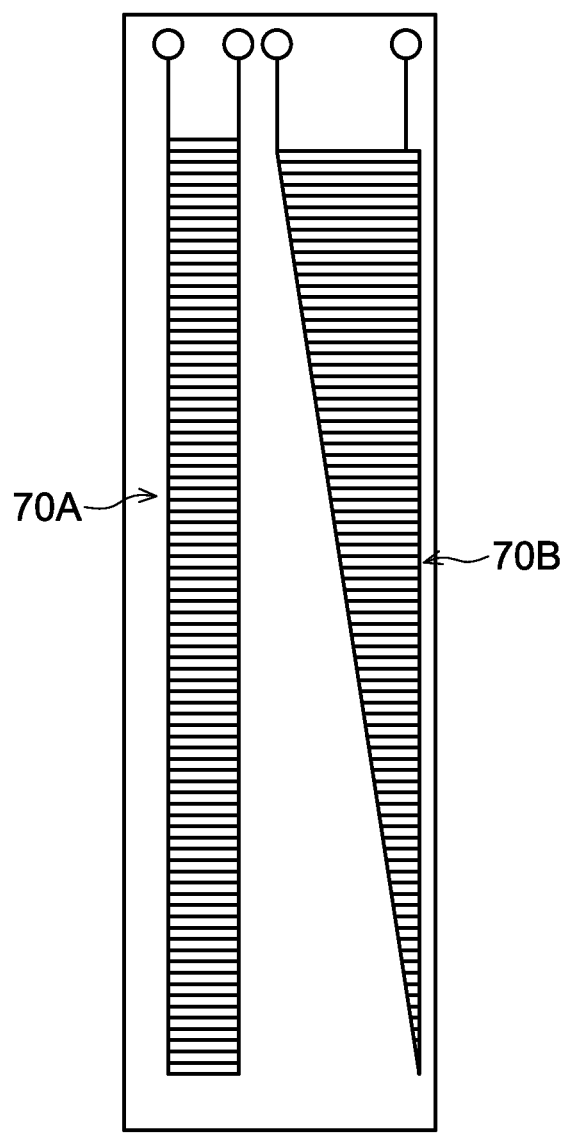
FIG. 7 is a drawing showing an example of electrode patterns of overlapping regions of a pair of electrode plates at a first detection, electrode and a second detection electrode.

An example of the electrode pattern in accordance with the first detection electrode 70A and an example of the electrode pattern in accordance with the second detection electrode 70B are shown in FIG. 7. At the first detection electrode 70A, the width of the overlapping region (surface area) of the electrodes 48, 54 (see FIG. 3A) of the pair of electrode plates 42, 44 is set to be substantially equal in the vertical direction (a rectangular shape). Further, at the second detection electrode 70B, the width of the overlapping region (surface area) of the electrodes 48, 54 (see FIG. 4A) of the pair of electrode plates 42, 44 is set so as to gradually become smaller from the upper side toward the lower side (an upside-down triangle shape). In this example, the width in the lateral direction of the first detection electrode 70A is, for example, 5 mm, and the length in the vertical direction of the first detection electrode 70A is, for example, 100 mm, and the maximum width (the width of the upper side) in the lateral direction of the second detection electrode 70B is set to be, for example, 10 mm.

Figure 8:
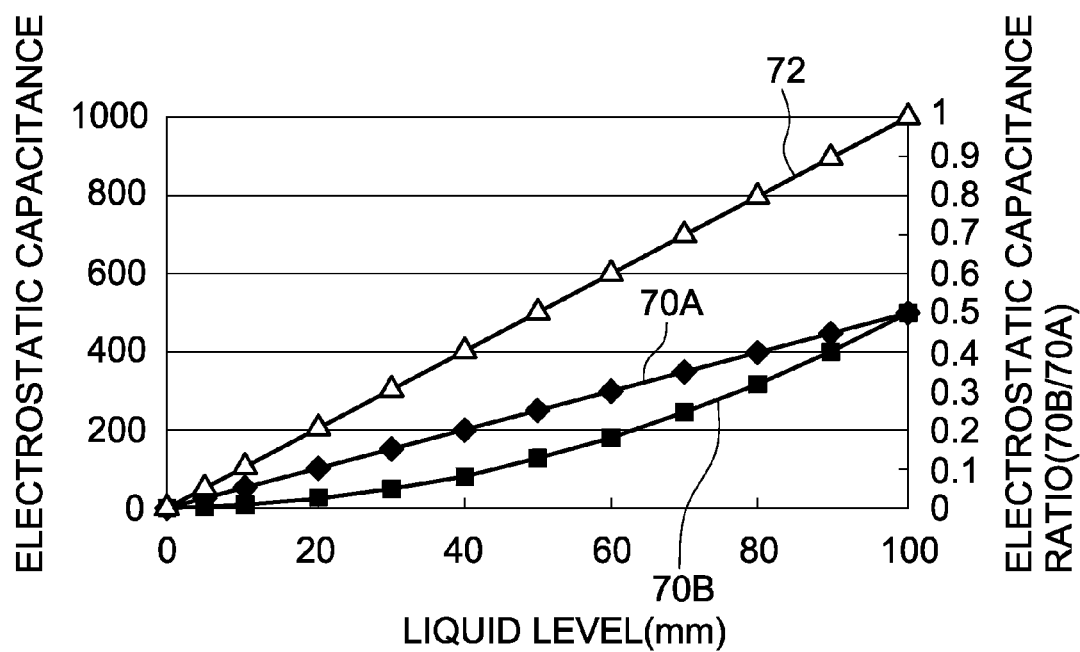
FIG. 8 is a graph showing the relationships between electrostatic capacitances and electrostatic capacitance ratio, and liquid level, in accordance with the first detection electrode and the second detection electrode shown in FIG. 7.

The relationships between the electrostatic capacitances according to the first defection electrode 70A and the second detection electrode 70B and the electrostatic capacitance ratio (70B/70A), and the liquid level (mm), are shown in FIG. 8. As shown in FIG. 8, the electrostatic capacitance between the electrodes 48, 54 is detected at the first detection electrode 70A, and the electrostatic capacitance between the electrodes 48, 54 is detected at the second detection electrode 70B. Then, by dividing the electrostatic capacitance detected at the second detection electrode 70B by the electrostatic capacitance detected at the first detection electrode 70A and determining the electrostatic capacitance ratio (70B/70A), the liquid level (mm) of the fuel L is detected from a graph 72 of the electrostatic capacitance ratio (70B/70A). The detection of the liquid level of the fuel L is carried out at a control section that has an unillustrated electrical circuit and is provided at the vehicle or the like.

As shown in FIG. 8, at the first detection electrode 70A, the electrostatic capacitance and the liquid level are proportionate, and there is no difference in the sensitivity in accordance with the liquid level. However, at the second detection electrode 70B, when the liquid level is low (when the remaining amount of the fuel L has becomes low), the sensitivity becomes lower.

Further, even if the properties of the fuel L change, the electrostatic capacitance ratio (70B/70A) is substantially constant. Because the electrostatic capacitance ratio (70B/70A) is looked at in the present embodiment, it is possible to detect the accurate liquid level.

Figure 9:
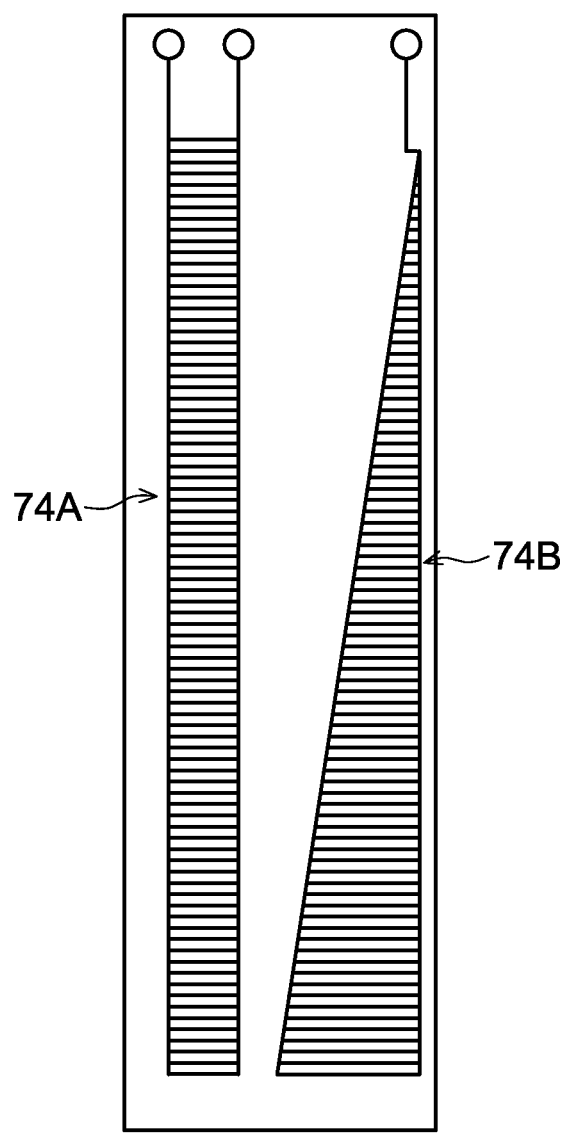
FIG. 9 is a drawing showing another example of electrode patterns of overlapping regions of the pair of electrode plates at the first detection electrode and the second detection electrode.

An example of the electrode pattern in accordance with a first detection electrode 74A and an example of the electrode pattern in accordance with a second detection electrode 74B are shown in FIG. 9. At the first detection electrode 74A, the width of the overlapping region (surface area) of the electrodes of the pair of electrode plates is set to be substantially equal in the vertical direction (a rectangular shape). Further, at the second detection electrode 74B, the width of the overlapping region (surface area) of the electrodes of the pair of electrode plates is set so as to gradually become larger from the upper side toward the lower side (a triangle shape). In this example, the width in the lateral direction of the first detection electrode 74A is, for example, 5 mm, and the length in the vertical direction of the first detection electrode 74A is, for example, 100 mm, and the maximum width (the width of the lower side) in the lateral direction of the second detection electrode 74B is set to be, for example, 10 mm.

Figure 10:
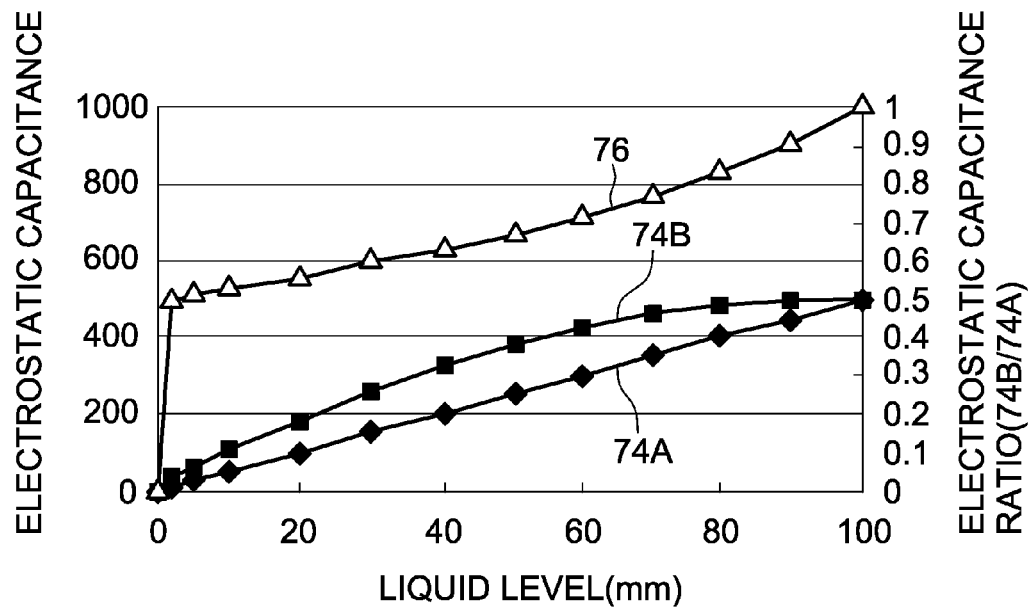
FIG. 10 is a graph showing the relationships between electrostatic capacitances and electrostatic capacitance ratio, and liquid level, in accordance with the first detection electrode and the second detection electrode shown in FIG. 9.

The relationships between the electrostatic capacitances in accordance with the first detection electrode 74A and the second detection electrode 74B and the electrostatic capacitance ratio (74B/74A), and the liquid level (mm), are shown in FIG. 10. As shown in FIG. 10, the electrostatic capacitance between the pair of electrodes is detected at the first detection electrode 74A, and the electrostatic capacitance between the pair of electrodes is detected at the second detection electrode 74B. Then, by determining the electrostatic capacitance ratio (74B/74A), the liquid level (mm) of the fuel L is detected from a graph 76 of the electrostatic capacitance ratio (74B/74A). As shown in FIG. 10, at the first detection electrode 74A, there is no difference in the sensitivity in accordance with the liquid level. However, at the second detection electrode 74B, when the liquid level is high (when there is much of the fuel L), the sensitivity becomes lower.

Either of the electrode patterns of FIG. 7 or FIG. 9 may be used, but, in the liquid level detecting device 40 of the first embodiment, the second detection electrode 70B, at which the sensitivity becomes lower when the liquid level is low (when the remaining amount of the fuel L has become low), is employed. Note that the electrode patterns may be changed in accordance with the sensitivity requirements of the liquid level detection of the fuel L.

Operation and effects of the liquid level detecting device 40 of the first embodiment and the liquid level detecting device 80 of the second embodiment are described next.

In the liquid level detecting device 40 of the first embodiment, as shown in FIG. 3A, the other electrode plate 44 moves in the closing direction with respect to the one electrode plate 42 due to the urging force of the coil spring 62, and the first detection electrode 70A is structured. Further, as shown in FIG. 4A and FIG. 5A, due to the return fuel L being jetted out from the distal end 22A of the pipe 22 toward the receiving surface 64 of the other electrode plate 44 by the driving structure 60, the other electrode plate 44 slides in the opening direction with respect to the one electrode plate 42 against the urging force of the coil spring 62, and is switched to the second detection electrode 70B. Namely, because the first detection electrode 70A and the second detection electrode 70B are structured from the common electrode plates 42, 44, there is no need to provide plural, independent detection electrodes.

Further, as the driving structure 60, the other electrode plate 44 is slid with respect to the one electrode plate 42 by the return fuel L that is ejected from the distal end 22A of the pipe 22. Therefore, existing parts such as the fuel pump 16 and the pressure regulator 20 and the like can be utilized, and there is no need to provide a driving structure separately.

Moreover, because the other electrode plate 44 slides along the surface direction with respect to the one electrode plate 42, the movable range of the other electrode plate 44 is small, and compactness is possible.

In the liquid level detecting device 80 of the second embodiment as well, similar operation and effects are obtained. Moreover, at the liquid level detecting device 80, by controlling the ejection path of the return fuel by the switching of the switching valve 82, the return fuel L is ejected from the distal end 22A of the pipe 22, and the other electrode plate 44 can be slid in the opening direction with respect to the one electrode plate 42.

Figure 29:
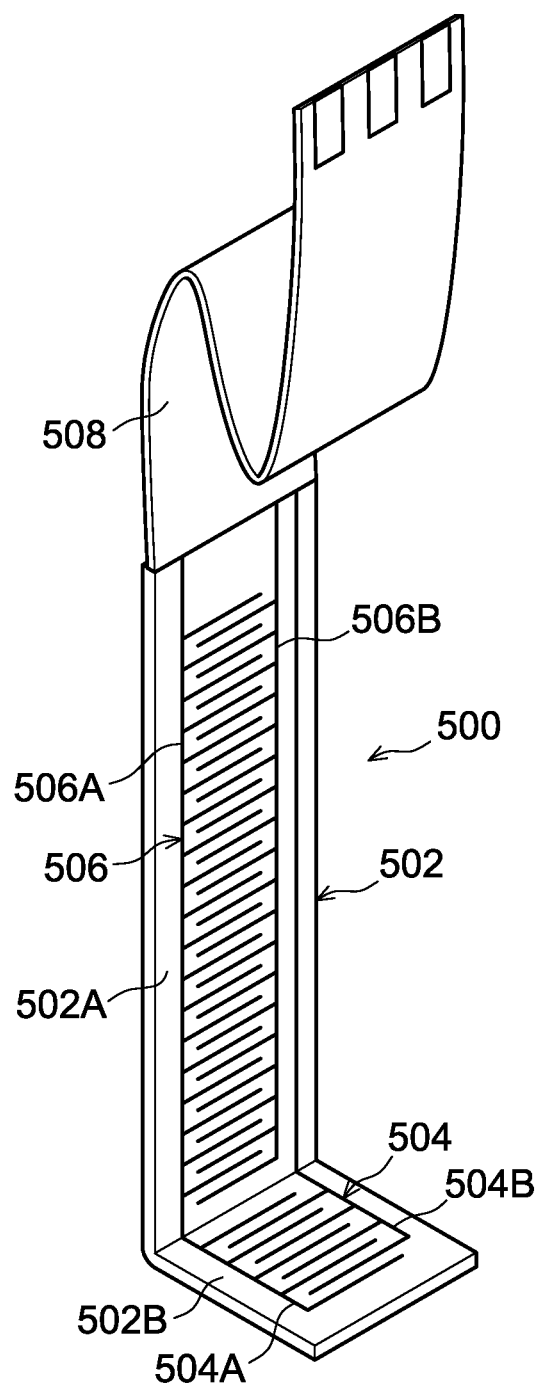
FIG. 29 is a perspective view showing a liquid level detecting device of a comparative example.

A liquid level detecting device 500 relating to a comparative example is shown in FIG. 29. As shown in FIG. 29, in the liquid level detecting device 500, a substantially L-shaped substrate 502 is provided. The substrate 502 has a vertical plate portion 502A that runs along the vertical direction, and a lateral plate portion 502B that is folded-over in the horizontal direction from the lower end portion of the vertical plate portion 502A. A fuel reference portion 504 having electrodes 504A, 504B that are in the forms of teeth of combs is provided at the lateral plate portion 502B, and the plural branch portions of the electrodes 504A, 504B axe arrayed alternately. A liquid level detecting portion 506, that has electrodes 506A, 506B that are in the forms of teeth of combs, is provided at the vertical plate portion 502A, and the plural branch portions of the electrodes 506A, 506B are arrayed alternately. The electrode 504A and the electrode 506A are formed in continuation. The fuel reference portion 504 is disposed along the lower surface of the fuel tank. A cable 508 is connected to the upper portion of the substrate 502. The electrodes 506A, 506B of the liquid level detecting portion 506 and the electrode 504B of the fuel reference portion 504 are electrically connected to wiring of the cable 508.

In this liquid level detecting device 500, the properties of the fuel (e.g., the ethanol concentration) are judged by the electrostatic capacitance value detected at the fuel reference portion 504. Further, the liquid level of the fuel is judged from the ratio of the electrostatic capacitance value detected at the fuel reference portion 504 and the electrostatic capacitance value detected at the liquid level defecting portion 506.

In this liquid level detecting device 500, the fuel reference portion 504 is disposed along the lower surface of the fuel tank. When separated water or foreign matter collects at the lower surface of the fuel tank, there is the possibility that detection of the accurate electrostatic capacitance value of the fuel by the fuel reference portion 504 will become difficult.

In contrast, at the liquid level detecting devices 40, 80 of the first and second embodiments, because there is no need to provide the fuel reference portion 504, detection of a more accurate liquid level of the fuel L is possible.

Next, a third embodiment of the liquid level detecting device relating to the present invention is described by using FIG. 11 through FIG. 13B. Note that the same structural portions as the above-described first and second embodiments are denoted by the same numbers, and description thereof is omitted.

Figure 11:
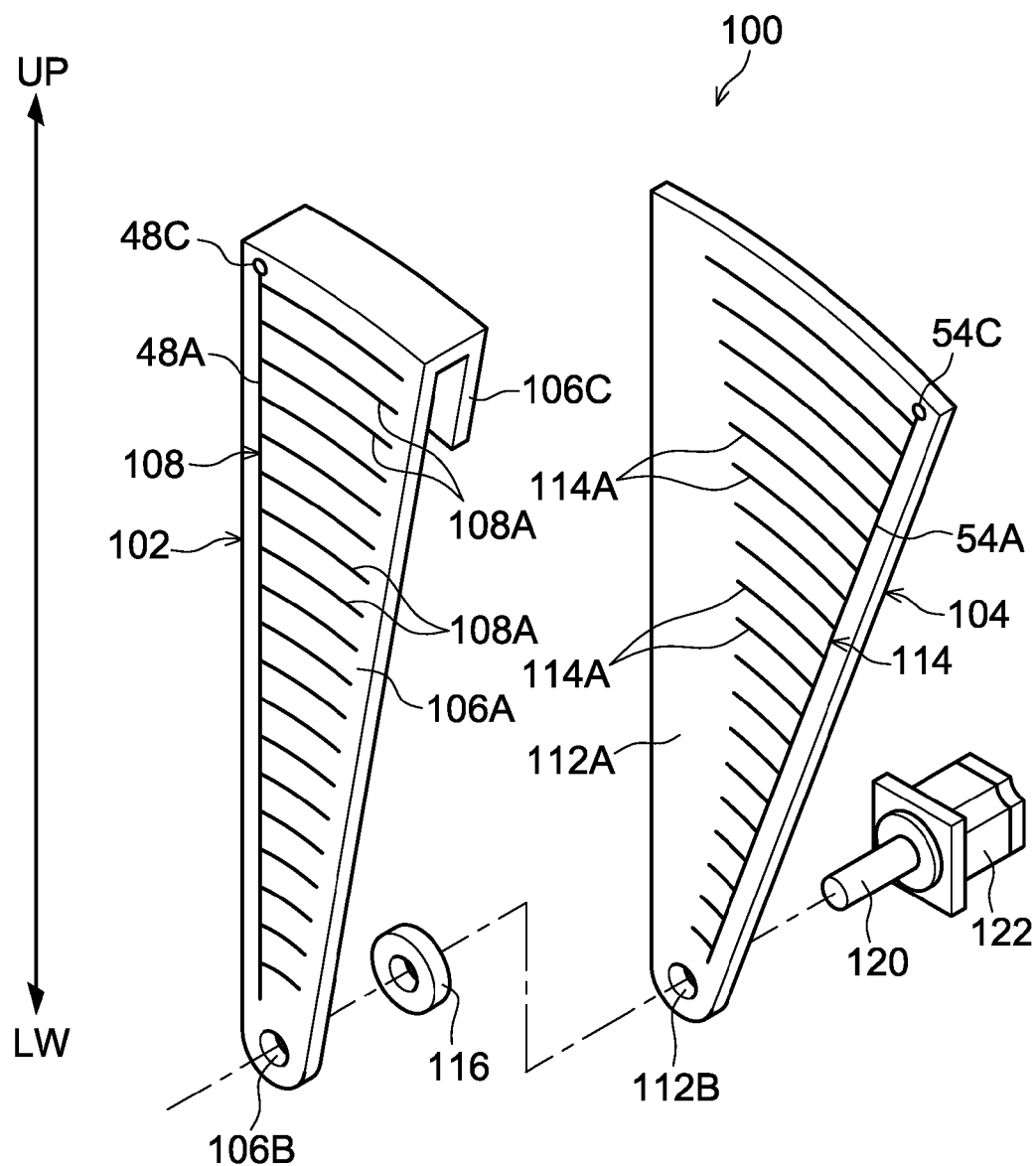
FIG. 11 is an exploded perspective view showing a pair of electrode plates used in a liquid level detecting device of a third embodiment of the present invention.
Figure 12A:
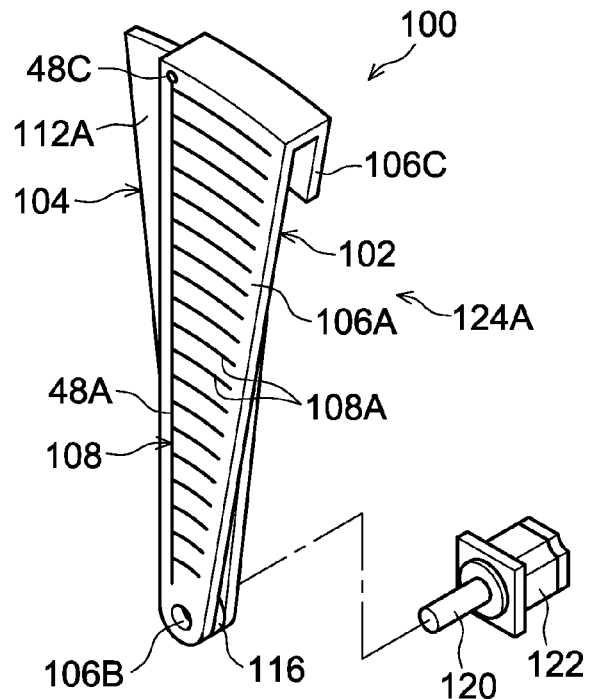
FIG. 12A is a perspective view showing a state in which a first detection electrode is structured by the liquid level detecting device shown in FIG. 11.
Figure 12B:
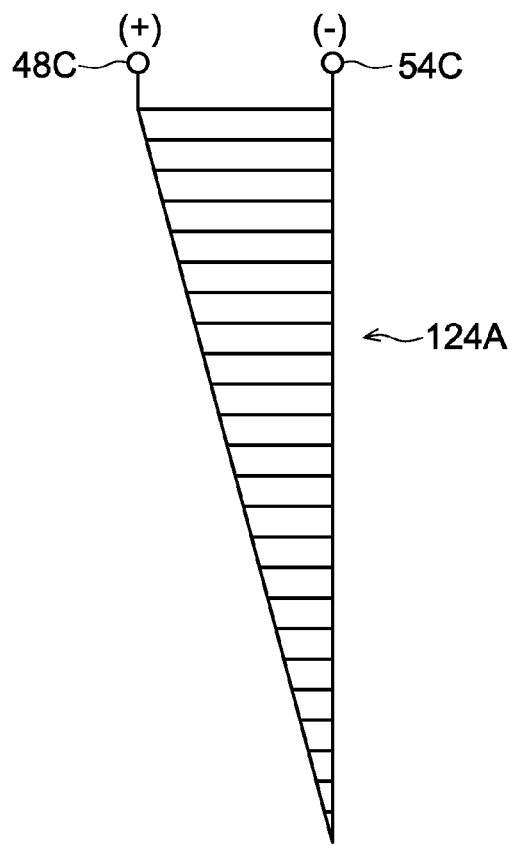
FIG. 12B is a drawing showing an electrode pattern of an overlapping region of the pair of electrode plates at the first detection electrode.
Figure 13A:
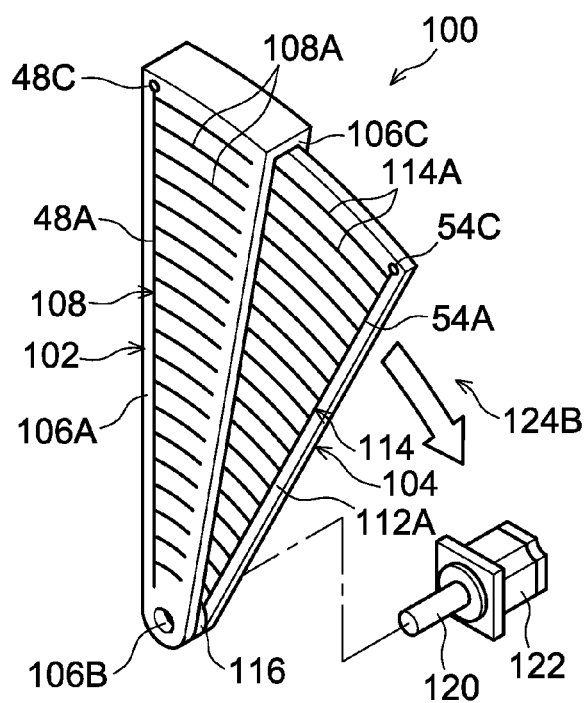
FIG. 13A is a perspective view showing a state in which a second detection electrode is structured by the liquid level detecting device shown in FIG. 11.
Figure 13B:
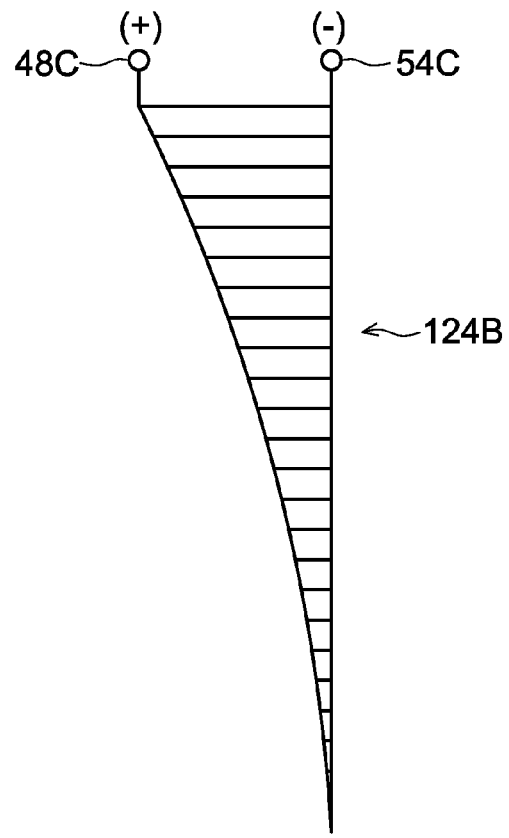
FIG. 13B is a drawing showing an electrode pattern of an overlapping region of the pair of electrode plates at the second detection electrode.

As shown in FIG. 11, FIG. 12A and FIG. 13A, a liquid level detecting device 100 has a pair of electrode plates 102, 104. The one electrode plate 102 has a substrate 106A that is made of resin and is shaped as a fan that is formed such that the surface area widens from the lower side toward the upper side. An electrode 108 (+ electrode) serving as a + electrode of a predetermined pattern is formed at the substrate 106A. A hole portion 106B, through which a rotating shaft 120 that serves as a variable structure is inserted, is formed in the lower end portion of the substrate 106A. A guide 106C, which is substantially U-shaped and supports the other electrode plate 104 so as to be slidable (rotatable) along a surface direction, is provided at the upper end portion of the substrate 106A.

The electrode 108 has plural branch portions 108A that extend from the rectilinear portion 48A in the form of teeth of a comb in a substantially perpendicular direction. The plural branch portions 108A are curved slightly convexly toward the upper side, and are disposed at substantially uniform intervals in the substantially vertical direction. The lengths of the plural branch portions 108A are set such that the lengths gradually become shorter from the upper side toward the lower side. The distal ends of the plural branch portions 108A are disposed so as to be lined-up rectilinearly in an inclined direction.

The other electrode plate 104 has a substrate 112A that is made of resin and is shaped as a fan that is formed such that the surface area widens from the lower side toward the upper side. An electrode 114 (− electrode) serving as a − electrode of a predetermined pattern is farmed at the substrate 112A. The width in the lateral direction (the direction orthogonal to the vertical direction) of the substrate 112A is greater than the width in the lateral direction (the direction orthogonal to the vertical direction) of the substrate 106A. A hole portion 112B, to which the rotating shaft 120 is attached, is formed in the lower end portion of the substrate 112A.

The electrode 114 has plural branch portions 114A that extend from the rectilinear portion 54A in the form of teeth of a comb in a substantially perpendicular direction. The plural branch portions 114A are curved slightly convexly toward the upper side, and are disposed at substantially uniform intervals in the substantially vertical direction. The lengths of the plural branch portions 114A are set such that the lengths gradually become shorter from the upper side toward the lower side. The distal ends of the plural branch portions 114A are disposed such that the intermediate portion in the vertical direction curves in an indented shape toward the side of the rectilinear portion 54A.

A spacer 116, that is insulating and that is for maintaining the distance between the electrodes 108, 114 constant, is interposed between the hole portion 106B of the electrode plate 102 and the hole portion 112B of the electrode plate 104. The rotating shaft 120 is joined to the hole portion 112B of the electrode plate 104, and the rotating shaft 120 can rotate in a state of being inserted-through the hole portion 106B of the electrode plate 102 and the spacer 116. A stepping motor 122 serving as a variable structure is connected to the rotating shaft 120. Due to the rotating shaft 120 being rotated by the stepping motor 122, the other electrode plate 104 can rotate along the surface direction in a state of being supported by the guide 106C of the one electrode plate 102. Namely, the one electrode plate 102 is fixed, and the other electrode plate 104 slides around the rotating shaft 120 with respect to the one electrode plate 102. Although not illustrated, stoppers, that restrict the rotating range of the electrode plate 104, are provided at the sides of both transverse direction sides of the electrode plate 104.

Due thereto, the overlapping region (surface area) of the electrode 114 of the other electrode plate 104 and the electrode 108 of the one electrode plate 102 is changed (switched) between a position that structures a first detection electrode 124A that is shown in FIG. 12A, and a position that structures a second detection electrode 124B that is shown in FIG. 13A. As shown, in FIG. 12B, an electrode pattern, in which the overlapping region (surface area) of the electrode 114 and the electrode 108 becomes smaller rectilinearly in an inclined direction from the upper side toward the lower side, is formed at the first detection electrode 124A. An electrode pattern, in which the overlapping region (surface area) becomes smaller so as to curve in a concave shape from the upper side toward the lower side, is formed at the second detection electrode 124B. Note that the electrode patterns of the first detection electrode 124A and the second detection electrode 124B may be changed depending on the sensitivity requirements of the liquid level detection of the fuel L.

At this liquid level detecting device 100, by rotating the rotating shaft 120 by the stepping motor 122 and rotating (sliding) the other electrode plate 104 by a predetermined amount with respect to the one electrode plate 102, the pattern can be switched between respective patterns according to the first detection electrode 124A and the second detection electrode 124B. Further, by detecting the respective electrostatic capacitances from the two patterns that are in accordance with the first detection electrode 124A and the second detection electrode 124B, and determining the electrostatic capacitance ratio, the liquid level of the fuel L can be detected by a method similar to the first embodiment. Note that a graph of the relationship between the electrostatic capacitance ratio and the liquid level of the fuel L is omitted.

In this liquid level detecting device 100, because the first detection electrode 124A and the second detection electrode 124B are structured from the common electrode plates 102, 104, there is no need to provide plural, independent detection electrodes.

Further, because the other electrode plate 104 rotates (slides) along the surface direction with respect to the one electrode plate 102, the movable range of the other electrode plate 104 is small, and compactness is possible.

A fourth embodiment of a liquid level detecting device relating to the present invention is described next by using FIG. 14 and FIG. 15. Note that the same structural portions as the above-described first through third embodiments are denoted by the same numbers, and description thereof is omitted.

Figure 14:
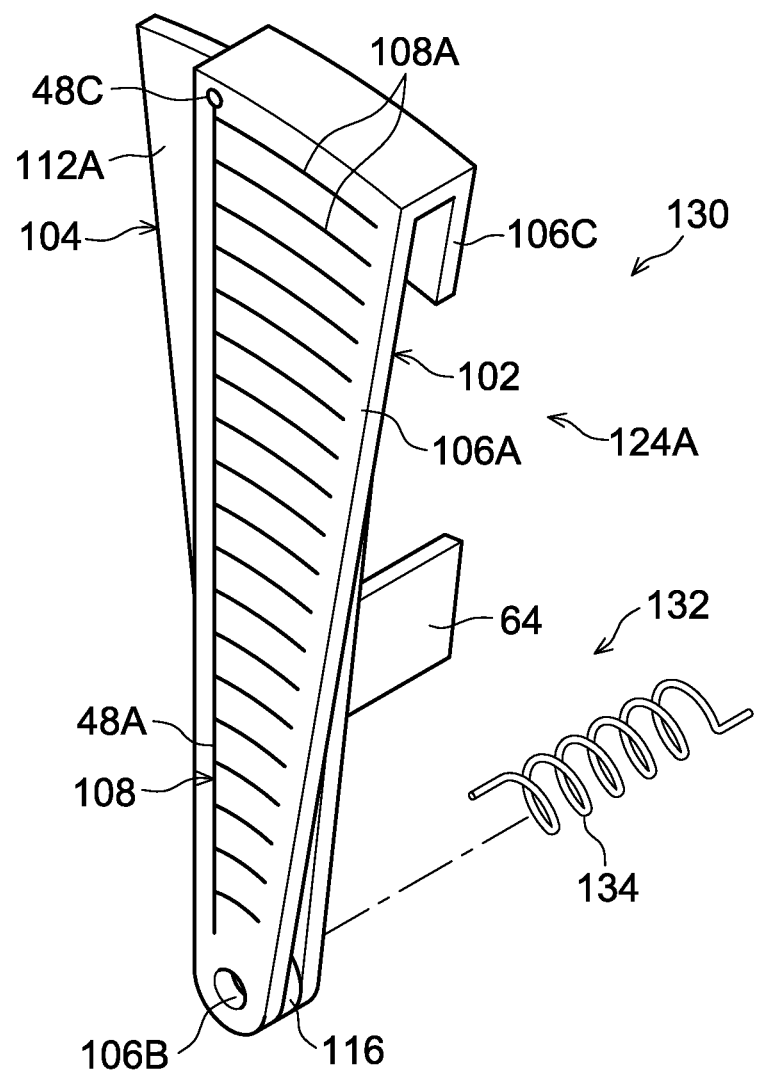
FIG. 14 is a perspective view showing a state in which a first detection electrode is structured by a liquid level detecting device of a fourth embodiment of the present invention.
Figure 15:
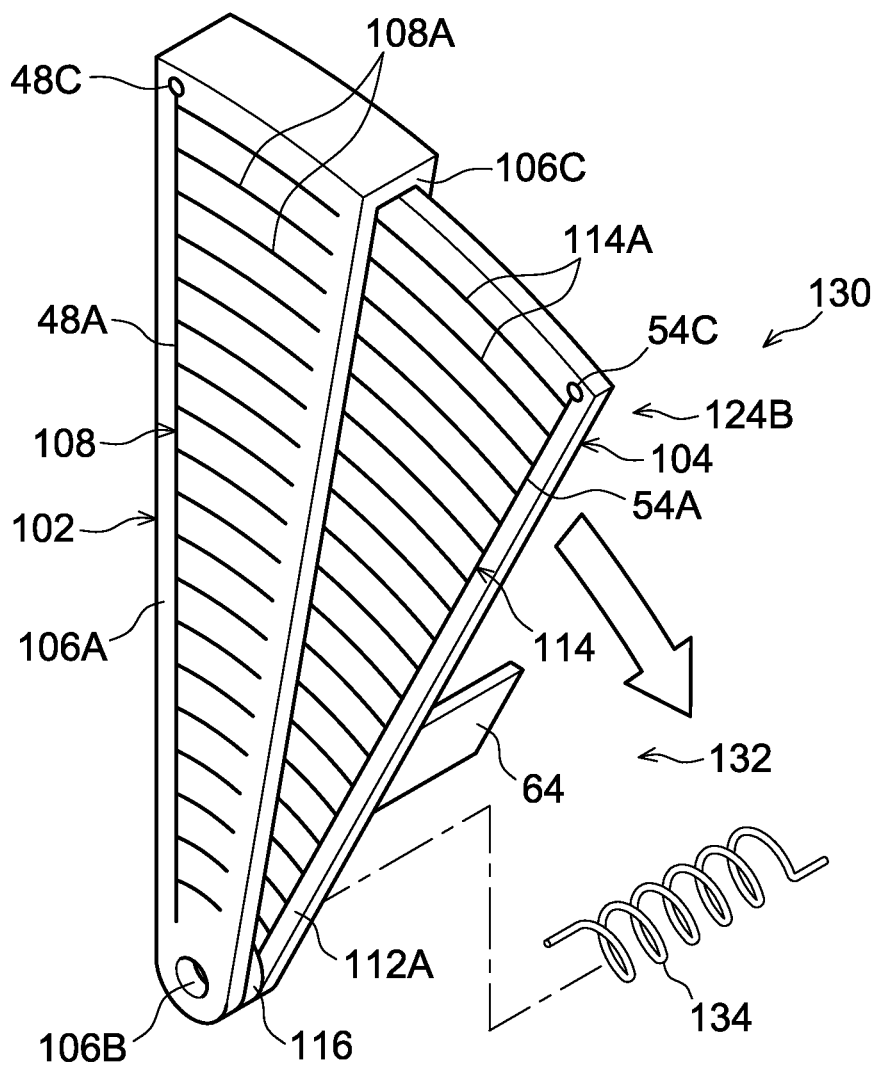
FIG. 15 is a perspective view showing a state in which a second detection electrode is structured by the liquid level detecting device of the fourth embodiment of the present invention.

As shown in FIG. 14 and FIG. 15, a liquid level detecting device 130 has the pair of electrode plates 102, 104. A driving structure 132, that serves as a variable structure and that changes the overlapping region (surface area) of the electrode 114 of the other electrode plate 104 and the electrode 108 of the one electrode plate 102, is provided at the liquid level detecting device 130.

The driving structure 132 has a torsion coil spring 134 that serves as an example of an urging member and that is mounted to a rotating shaft (not shown) that is inserted-through the hole portion 106B of the electrode plate 102 and the hole portion 112B of the electrode plate 104, and the receiving surface 64 that is disposed in a direction perpendicular to the surface of the substrate 112A and receives the return fuel L ejected from the pipe 22 (see FIG. 1). As shown in FIG. 14, the torsion coil spring 134 urges the other electrode plate 104 toward a position that structures the first detection electrode 124A (the side at which the other electrode plate 104 is closed). Although not illustrated, stoppers, that restrict the rotating range of the electrode plate 104, are provided at the sides of both transverse direction sides of the electrode plate 104.

In this liquid level detecting device 130, as shown in FIG. 14, the other electrode plate 104 moves to the closed side by the urging force of the torsion coil spring 134, and structures the first detection electrode 124A. As shown in FIG. 15, due to the receiving surface 64 receiving the return fuel L that is elected from the pipe 22 (see FIG. 1), the other electrode plate 104 rotates, against the urging force of the torsion coil spring 134, around the unillustrated rotating shaft to a position that structures the second detection electrode 124B (the side shown by the arrow at which the other electrode plate 104 opens). Due to the respective electrostatic capacitances being detected from the two patterns that are in accordance with the first detection electrode 124A and the second detection electrode 124B, and the electrostatic capacitance ratio being determined, the liquid level of the fuel L can be detected.

Figure 16:
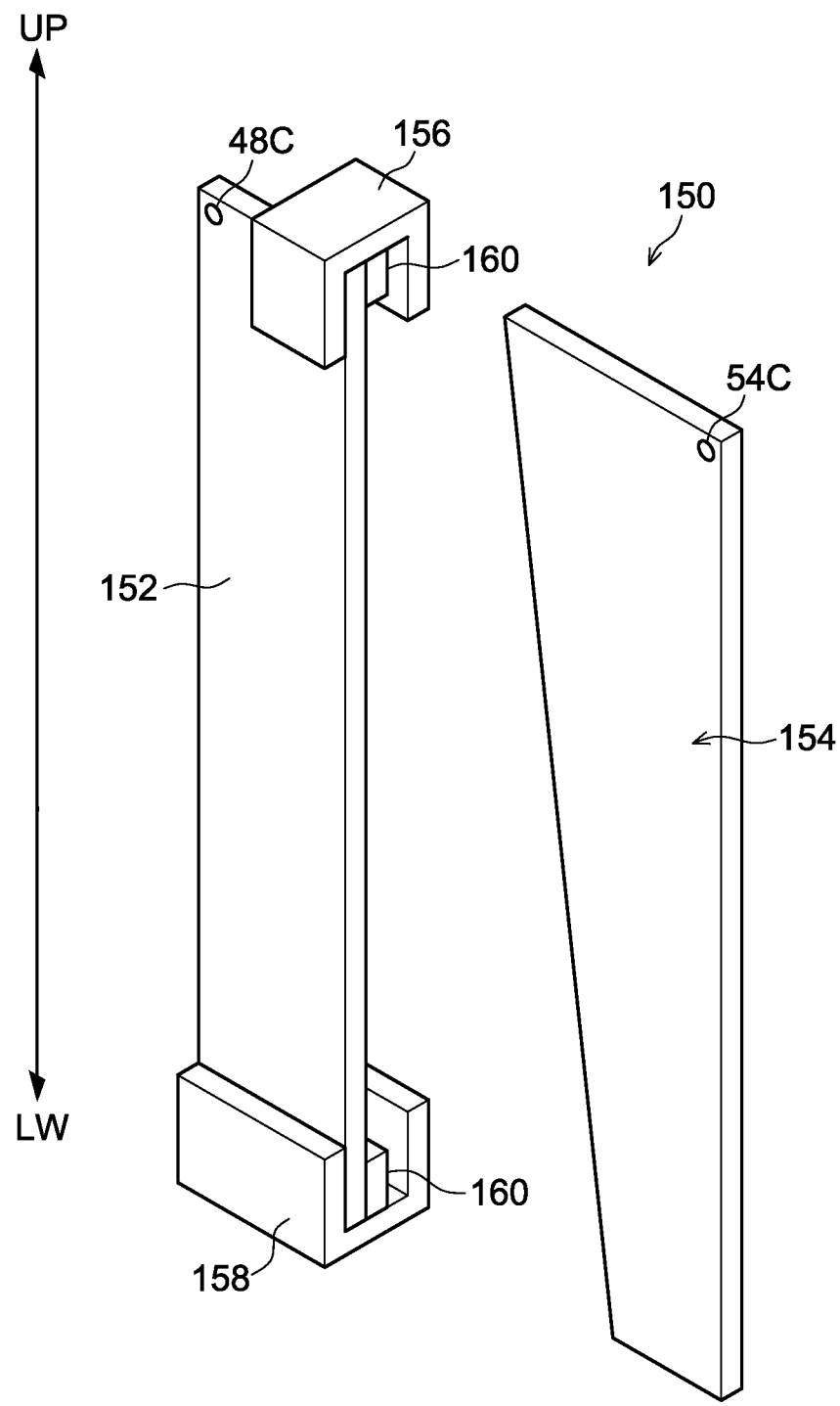
FIG. 16 is an exploded perspective view showing a pair of electrode plates that are used in a liquid level detecting device of a fifth embodiment of the present invention.

Next, a fifth embodiment of the liquid level detecting device relating to the present invention is described by using FIG. 16. Note that the same structural portions as the above-described first through fourth embodiments are denoted by the same numbers, and description thereof is omitted.

As shown in FIG. 16, a liquid level detecting device 150 has a pair of electrode plates 152, 154 that are formed from plates made of metal. The electrode plate 152 is a + electrode, and the width thereof in the lateral direction is formed to the same length in the vertical direction. The electrode plate 154 is a − electrode, and the width thereof in the lateral direction is formed so as to gradually become shorter from the upper side toward the lower side. Guides 156, 158, that are insulating and are substantially U-shaped and slidably support the electrode plate 154, are provided at the upper end portion and the lower end portion of the electrode plate 152. Spacers 160, that are insulating and are for keeping the distance between the electrode plates 152, 154 constant, are interposed at the upper side and lower side between the electrode plate 152 and the electrode plate 154.

Although not illustrated, the driving structure 60 (see FIG. 3A and FIG. 4A), that slides the other electrode plate 154 in the horizontal direction with respect to the one electrode plate 152, is provided at the liquid level detecting device 150. Due thereto, the other electrode plate 154 is moved between a position that structures the first detection electrode 70A (see FIG. 3B) and a position that structures the second detection electrode 70B (see FIG. 4B), and the overlapping region (surface area) of the electrode plate 152 and the electrode plate 154 can be switched to two different patterns.

In this liquid level detecting device 150, by providing the pair of electrode plates 152, 154 that are formed from plates made of metal instead of electrode plates having the electrodes 48, 54 such as shown in FIG. 2, there is no need to form electrode wires, and the structure can be made to be simpler.

Figure 17:
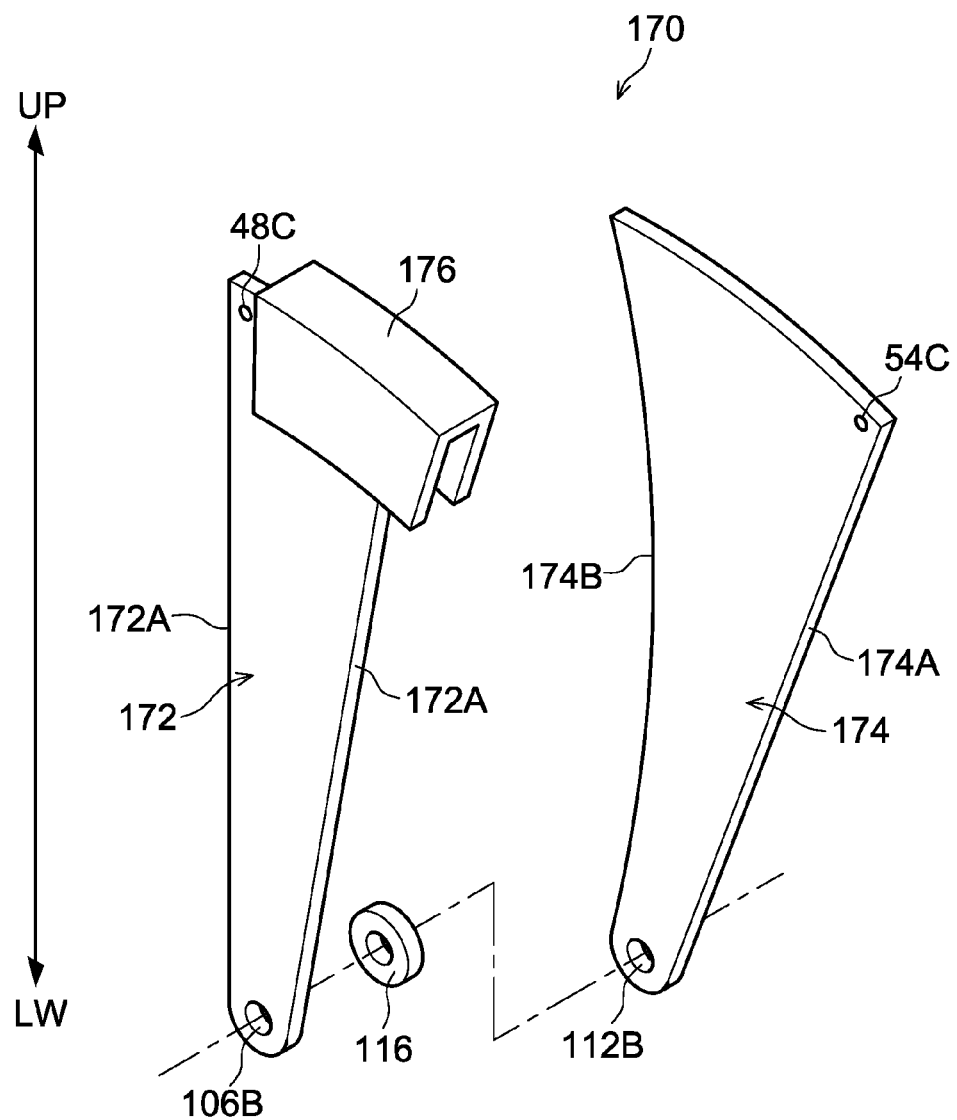
FIG. 17 is an exploded perspective view showing a pair of electrode plates that are used in a liquid level detecting device of a sixth embodiment of the present invention.

Next, a sixth embodiment of the liquid level detecting device relating to the present invention is described by using FIG. 17. Note that the same structural portions as the above-described first through fifth embodiments are denoted by the same numbers, and description thereof is omitted.

As shown in FIG. 17, a liquid level detecting device 170 has a pair of electrode plates 172, 174 that are formed front plates made of metal. The electrode plate 172 is a + electrode, and is formed in the shape of a fan whose width in the lateral direction gradually becomes smaller from the upper side toward the lower side. Edge portions 172A at both transverse direction sides of the electrode plate 172 are formed rectilinearly so as to be inclined in oblique directions. The electrode plate 174 is a − electrode, and is formed in the shape of a fan whose width in the lateral direction suddenly becomes smaller than the electrode plate 172 from the upper side toward the lower side. One edge portion 174A in the transverse direction of the electrode plate 174 is formed rectilinearly so as to be inclined in an oblique direction, and another edge portion 174B in the transverse direction of the electrode plate 174 is formed such that the intermediate portion in the vertical direction curves in an indented shape.

A guide 176, that is insulating and is formed in a substantial U-shape and supports the electrode plate 174 rotatably around a rotating shaft (not shown) that is provided at the lower end portion, is provided at the upper end portion of the electrode plate 172.

Although not illustrated, a stepping motor (see FIG. 11) or a torsion coil spring (see FIG. 14), that rotates the other electrode plate 174 around the rotating shaft (not shown) at the lower end portion with respect to the one electrode plate 172, is provided at the liquid level detecting device 170. Due thereto, the other electrode plate 174 is moved between a position that structures the first detection electrode 124A (see FIG. 12B) and a position that structures the second detection electrode 124B (see FIG. 13B), and the overlapping region (surface area) of the electrode plate 172 and the electrode plate 174 can be switched to two different patterns.

In this liquid level detecting device 170, by providing the pair of electrode plates 172, 174 that are formed from plates made of metal instead of electrode plates having the electrodes 108, 114 such as shown in FIG. 11, there is no need to form electrode wires, and the structure can be made to be simpler.

Next, a seventh embodiment of the liquid level detecting device relating to the present invention is described by using FIG. 18 through FIG. 20B. Note that the same structural portions as the above-described first through sixth embodiments are denoted by the same numbers, and description thereof is omitted.

Figure 18:
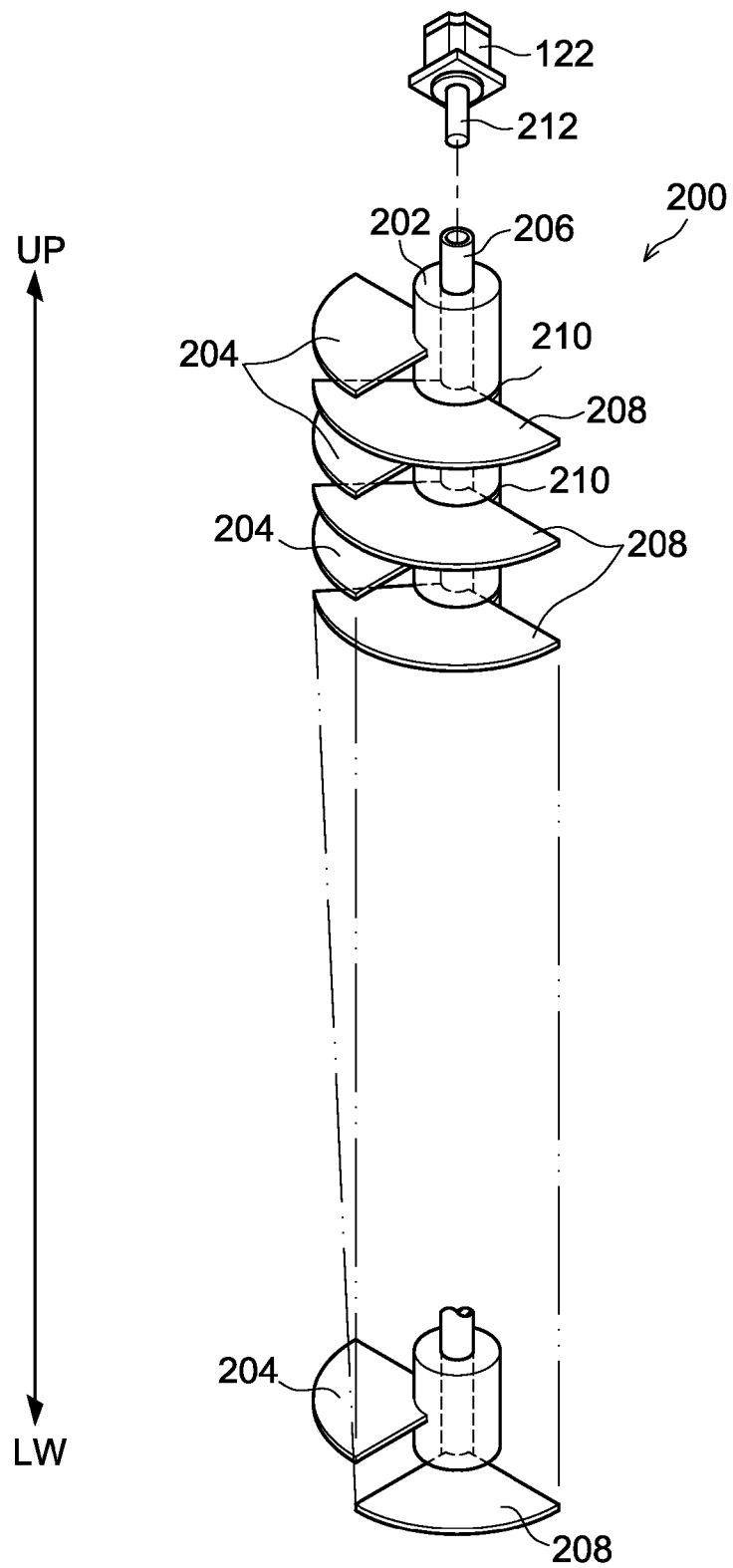
FIG. 18 is a perspective view showing a liquid level detecting device of a seventh embodiment of the present invention.

As shown in FIG. 18, at a liquid level detecting device 200, plural fan-shaped electrode plates 204 (+ electrodes) that are formed from metal plates are provided at a shaft portion 202 that is disposed in the vertical direction. Further, at the liquid level detecting device 200, plural fan-shaped electrode plates 208 (− electrodes) that are formed from metal plates are provided at a shaft portion 206 that is disposed so as to pass-through the central portion of the shaft portion 202. The electrode plates 204 and the electrode plates 208 are disposed alternately along the vertical direction. The shaft portion 202 and the shaft portion 206 are made of metal, and are disposed in a state of being insulated from one another. The shaft portion 202 is fixed, and the shaft portion 206 can rotate with respect to the shaft portion 202. Plural slits 210, at which the electrode plates 208 can rotate, are formed in portions of the peripheral surface of the shaft portion 202 along the peripheral direction. A rotating shaft 212 of the stepping motor 122 that serves as a variable structure is connected to the upper end portion of the shaft portion 206.

The electrode plates 204 are disposed at substantially uniform intervals in the vertical direction of the shaft portion 202, and the shapes (surface areas) of the electrode plates 204 at the upper and lower sides are set to be substantially the same. The plural electrode plates 204 are provided at substantially the same positions of the peripheral surface of the shaft portion 202 in the vertical direction, such that the plural electrode plates 204 overlap in plan view.

The electrode plates 208 are disposed at substantially uniform intervals in the vertical direction of the shaft portion 206, and the shapes (surface areas) of the electrode plates 208 are set so as to become larger from the lower side toward the upper side. Note that, although not illustrated, stoppers, that restrict the rotating range of the shaft portion 206, are provided at both rotating direction sides of the shaft portion 206.

Figure 19A:
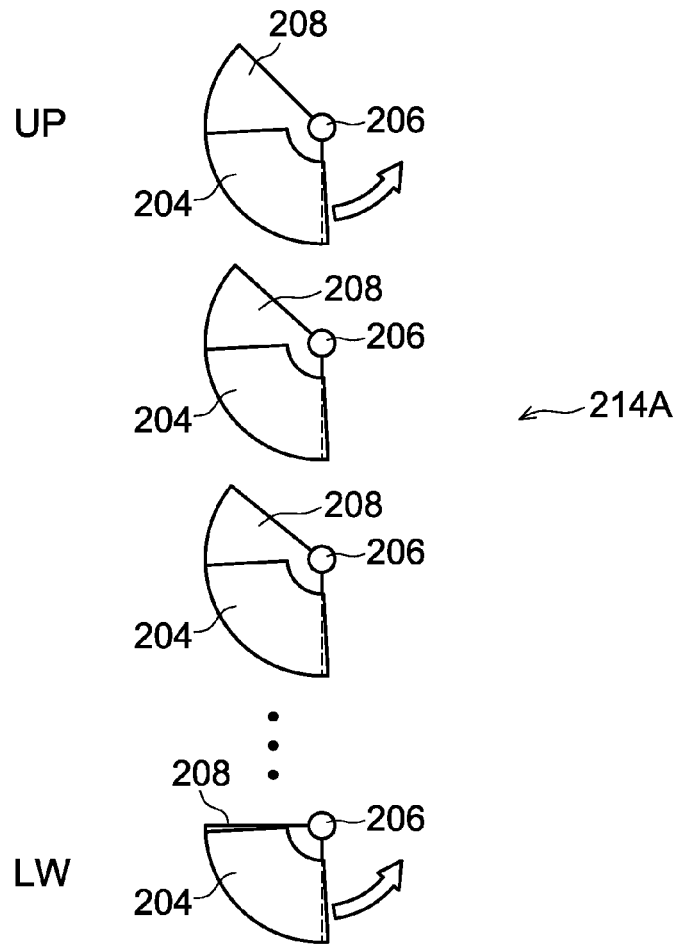
FIG. 19A is a drawing showing a state in which a first detection electrode is structured by the liquid level detecting device shown in FIG. 18, and is respective plan views showing overlapping regions of pairs of electrode plates from an upper side to a lower side.
Figure 19B:
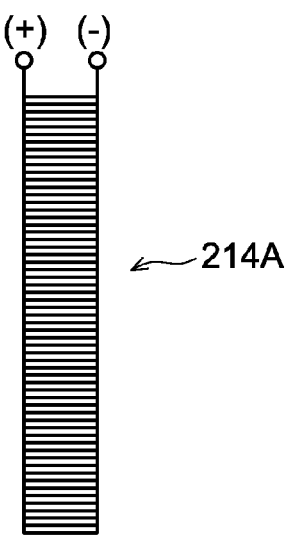
FIG. 19B is a drawing showing an electrode pattern of the overlapping region of the pair of electrode plates at the first detection electrode.
Figure 20A:
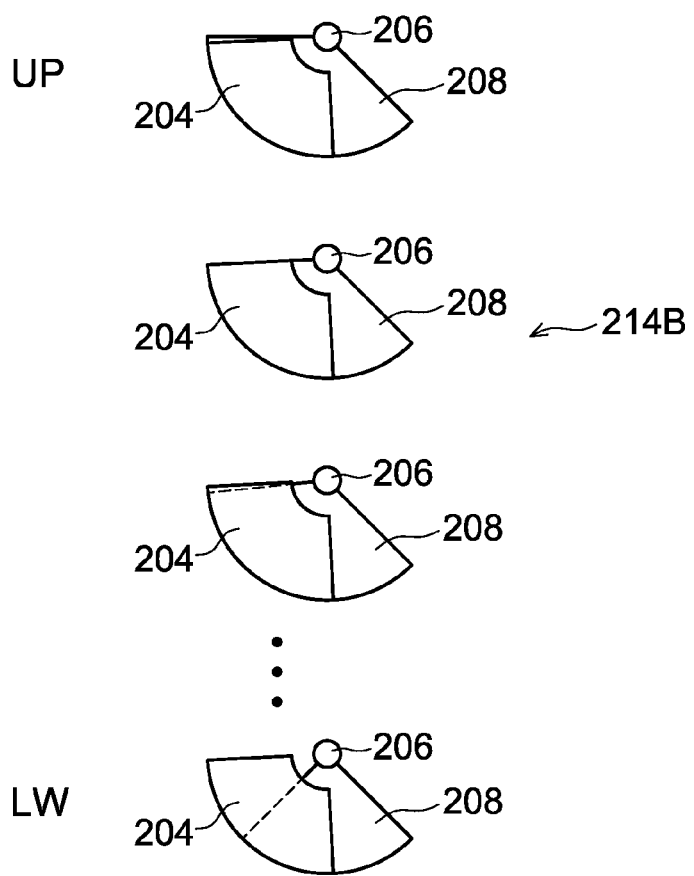
FIG. 20A is a drawing showing a state in which a second detection electrode is structured by the liquid level detecting device shown in FIG. 18, and is respective plan views showing overlapping regions of the pairs of electrode plates from an upper side to a lower side.
Figure 20B:
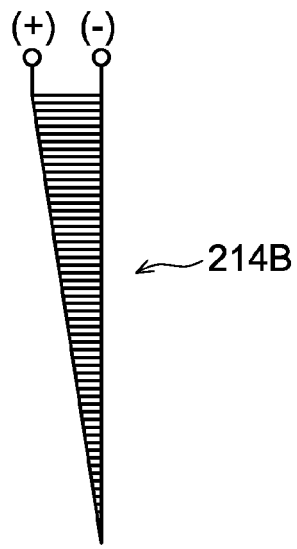
FIG. 20B is a drawing showing an electrode pattern of the overlapping region of the pair of electrode plates at the second detection electrode.

Plan views of the overlapping regions of the electrode plates 204 and the electrode plates 208 at respective regions in the vertical direction of the shaft portion 206, are shown in FIG. 19A and FIG. 20A. Due to the shaft portion 206 rotating with respect to the shaft portion 202 by the stepping motor 122, the electrode plates 208 move between positions structuring a first detection electrode 214A shown in FIG. 19A and positions structuring a second detection electrode 214B shown in FIG. 20A. Due thereto, the overlapping region (lapped surface area) of the electrode plate 204 and the electrode plate 208 in the vertical direction of the shaft portion 206 changes, and, as shown in FIG. 19B and FIG. 20B, can be switched to two electrode patterns.

Due to the respective electrostatic capacitances being detected from the two patterns that are in accordance with the first detection electrode 214A and the second detection electrode 214B, and the electrostatic capacitance ratio being determined, the liquid level of the fuel L can be detected. Note that the electrode patterns of the first detection electrode 214A and the second detection electrode 214B may be changed in accordance with the sensitivity requirements of the liquid level, detection of the fuel L.

In this liquid level detecting device 200, because the first detection electrode 214A and the second detection electrode 214B are structured from the common electrode plates 204, 208, there is no need to provide plural, independent detection electrodes.

Figure 21:
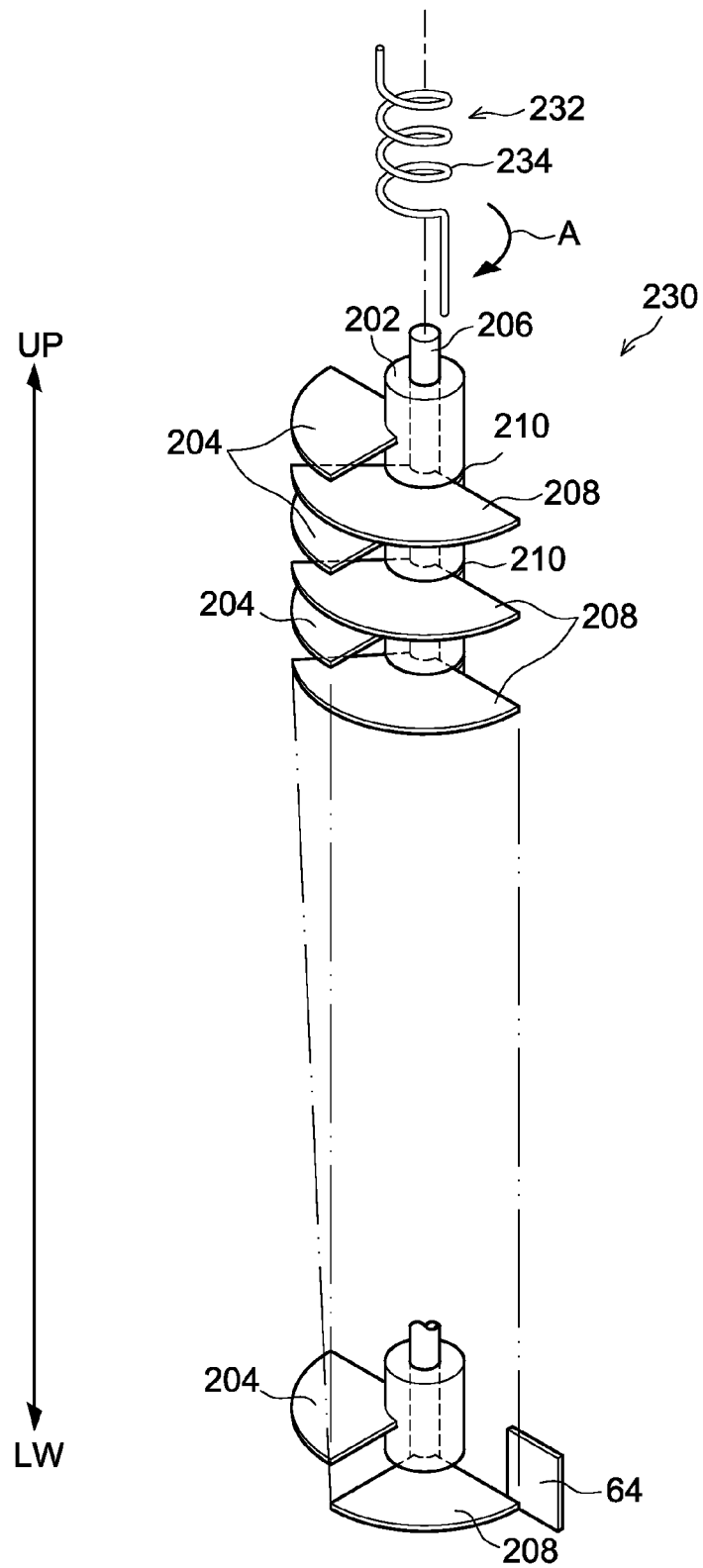
FIG. 21 is a perspective view showing a liquid level detecting device of an eighth embodiment of the present invention.

Next, an eighth embodiment of the liquid level detecting device relating to the present invention is described by using FIG. 21. Note that the same structural portions as the above-described first through seventh embodiments are denoted, by the same numbers, and description thereof is omitted.

As shown in FIG. 21, a driving structure 232, that rotates the shaft portion 206 with respect to the shaft portion 202 and changes the overlapping region (lapped surface area) of the electrode plates 204 and the electrode plates 208, is provided at a liquid level detecting device 230. The driving structure 232 has a torsion coil spring 234 that serves as an example of an urging member and urges the shaft portion 206 in the direction in which the electrode plates 208 close toward the electrode plate 204 sides (the arrow A direction), and the receiving surface 64 that is provided to stand from the electrode plate 208 at the lower end portion in a direction intersecting the rotating direction and that receives the return fuel L that is ejected from the pipe 22 (see FIG. 1). The torsion coil spring 234 urges the electrode plates 208 toward the position structuring the first detection electrode 214A (see FIG. 19A).

In this liquid level detecting device 230, due to the urging force of the torsion coil spring 234, the electrode plates 208 move in the closing direction toward the electrode plate 204 sides, and the first detection electrode 214A is structured. Then, due to the receiving surface 64 receiving the return fuel L that is ejected from the pipe 22 (see FIG. 1), the shaft portion 206 rotates with respect to the shaft portion 202, against the urging force of the torsion coil spring 234, to the position structuring the second detection electrode 214B (see FIG. 20A).

Next, a ninth embodiment of the liquid level detecting device relating to the present invention is described by using FIG. 22 through FIG. 24B. Note that the same structural portions as the above-described first through eighth embodiments are denoted by the same numbers, and description thereof is omitted.

Figure 22:
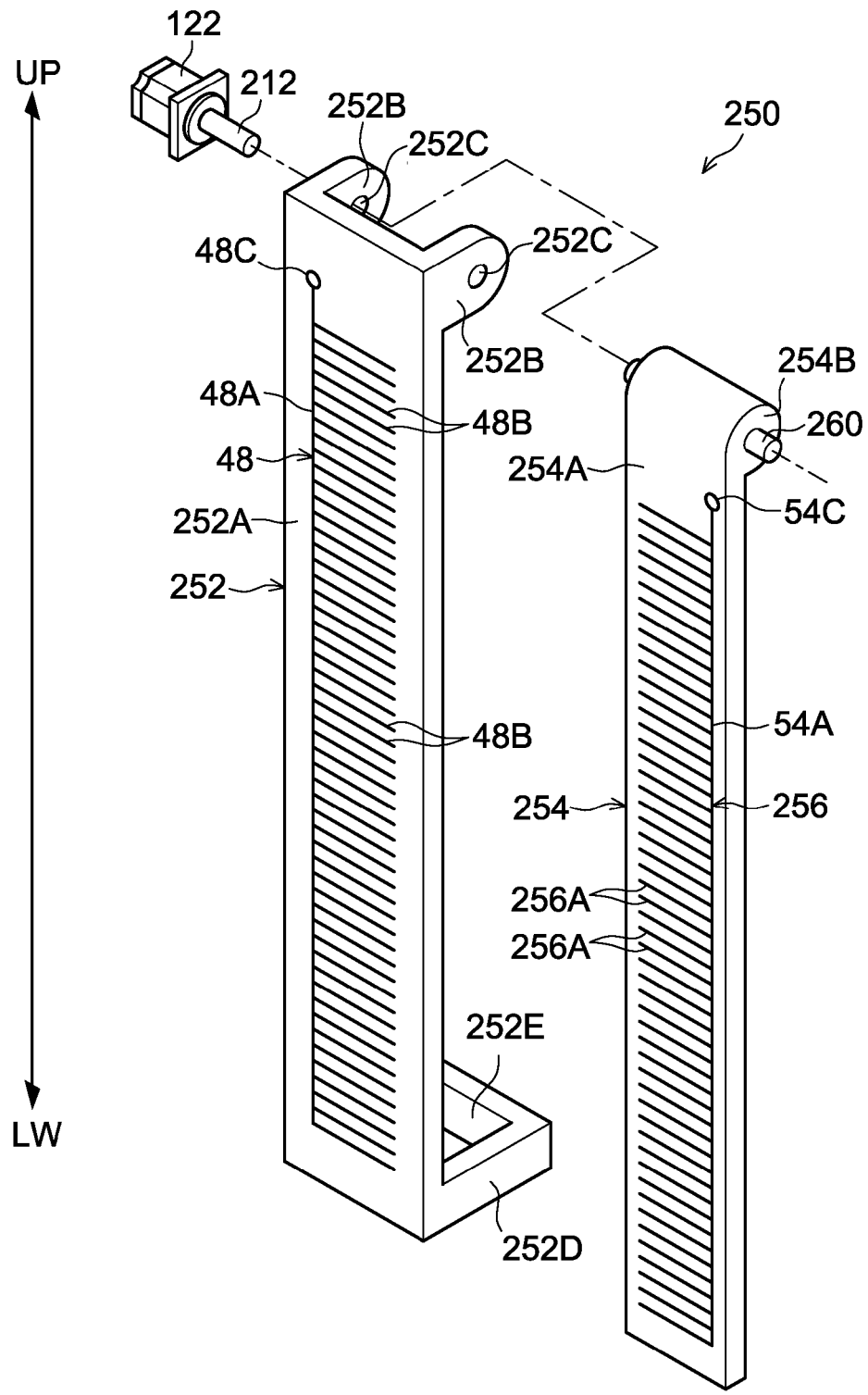
FIG. 22 is an exploded perspective view showing a liquid level detecting device of a ninth embodiment of the present invention.

As shown in FIG. 22, a liquid level detecting device 250 has a pair of electrode plates 232, 254. The one electrode plate 252 has a substrate 252A that is made of resin and is rectangular, and the electrode 48 (+ electrode) that serves as a + electrode of a predetermined pattern is formed at the substrate 252A. A pair of left and right supporting portions 252B project-out from the both transverse direction sides of the upper end portion of the substrate 252A. Hole portions 252C, through which a rotating shaft 260 that serves as a variable structure is inserted, are formed in the supporting portions 252B. A guide 252D, that has an opening portion 252E into which the other electrode plate 254 is inserted, is provided at the lower end portion of the substrate 252A.

The other electrode plate 254 has a substrate 254A that is made of resin and is rectangular, and an electrode 256 (– electrode) that serves as a – electrode of a predetermined pattern is formed at the substrate 254A. A mounting portion 254B, that is solid-cylindrical and thicker than the substrate 254A, is formed at the upper end portion of the substrate 254A. The rotating shaft 260 is mounted to the mounting portion 254B in a direction orthogonal to the vertical direction. The rotating shaft 260 can rotate in a state of being inserted-through the hole portions 252C of the supporting portions 252B of the electrode plate 252. The rotating shaft 212 of the stepping motor 122 that serves as a variable structure is connected to the rotating shaft 260. Due to rotation of the rotating shaft 260, the electrode plate 254 moves in directions of approaching and moving away with respect to the electrode plate 252.

The electrode 256 has plural branch portions 256A that extend in the shape of teeth of a comb in a substantially perpendicular direction from the rectilinear portion 54A. The plural branch portions 256A are disposed at substantially uniform intervals in the substantially vertical direction, and the lengths of the plural branch portions 256A are formed to substantially the same lengths at the upper and lower sides.

In this liquid level detecting device 250, due to the rotating shaft 260 being rotated by the stepping motor 122, the other electrode plate 254 moves in directions of approaching and moving away along the guide 252D of the one electrode plate 252. Due thereto, the distance between the electrode 256 of the other electrode plate 254 and the electrode 48 of the one electrode plate 252 is changed (switched) between a position structuring a first detection electrode 264A shown in FIG. 23A and a position structuring a second detection electrode 264B shown in FIG. 24A. The guide 252D has the function of a stopper that restricts the moving range of the electrode plate 254.

Figure 23A:
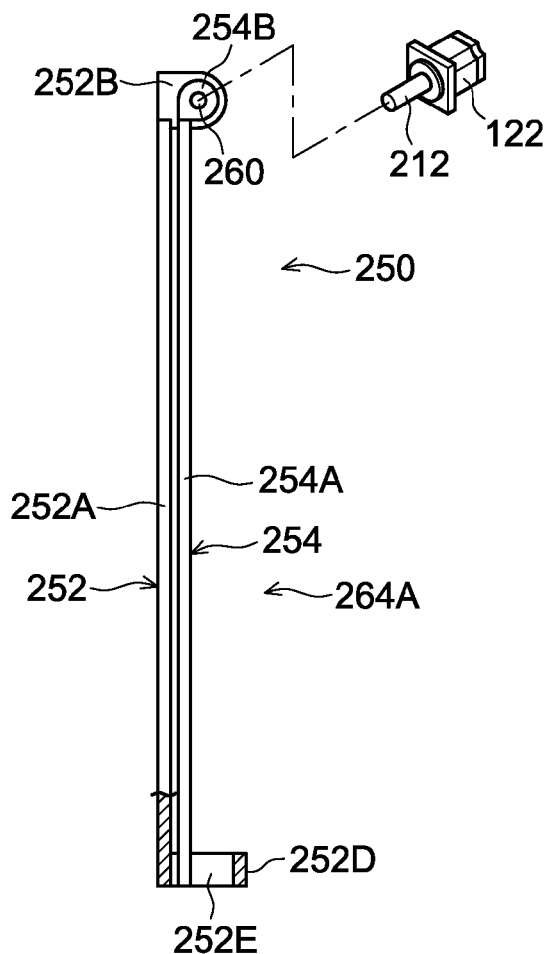
FIG. 23A is a side view showing a state in which a first detection electrode is structured by the liquid level detecting device shown in FIG. 22.
Figure 23B:
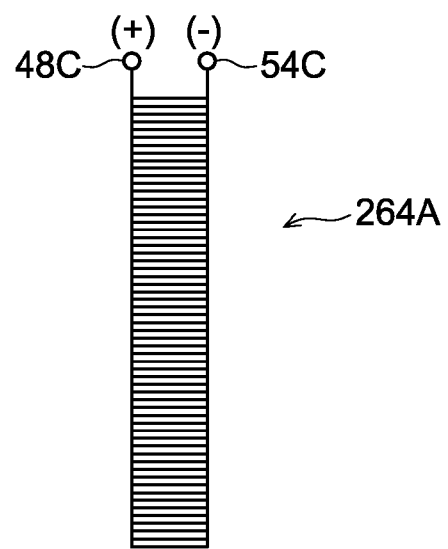
FIG. 23B is a drawing showing an electrode pattern of an overlapping region of a pair of electrode plates at the first detection electrode.
Figure 24A:
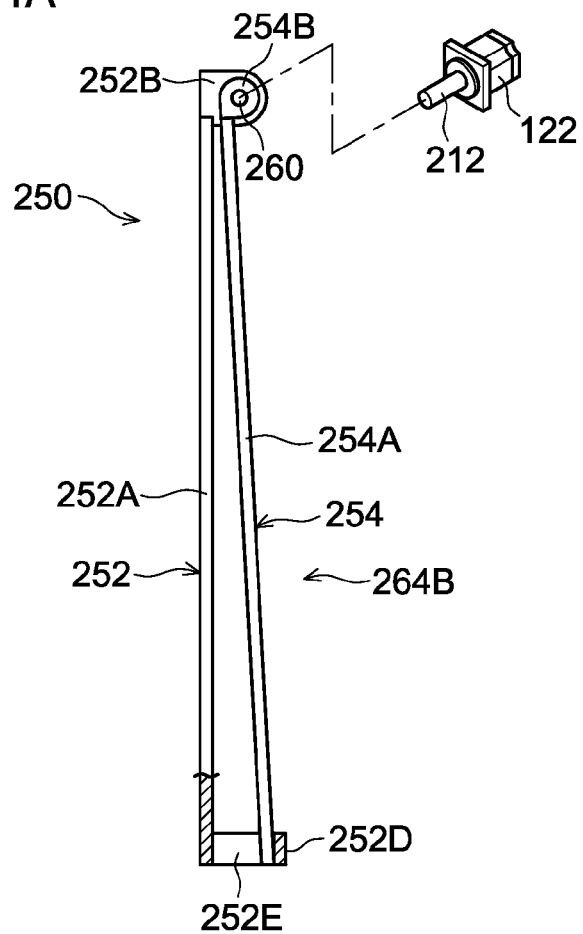
FIG. 24A is a side view showing a state in which a second detection, electrode is structured by the liquid level detecting device shown in FIG. 22.
Figure 24B:
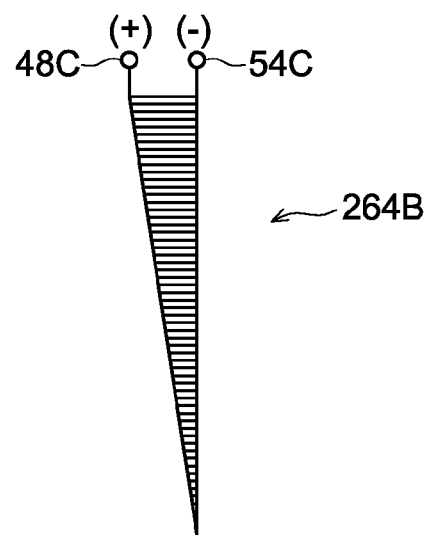
FIG. 24B is a drawing showing an electrode pattern of an overlapping region of the pair of electrode plates at the second detection electrode.
Figure 25:
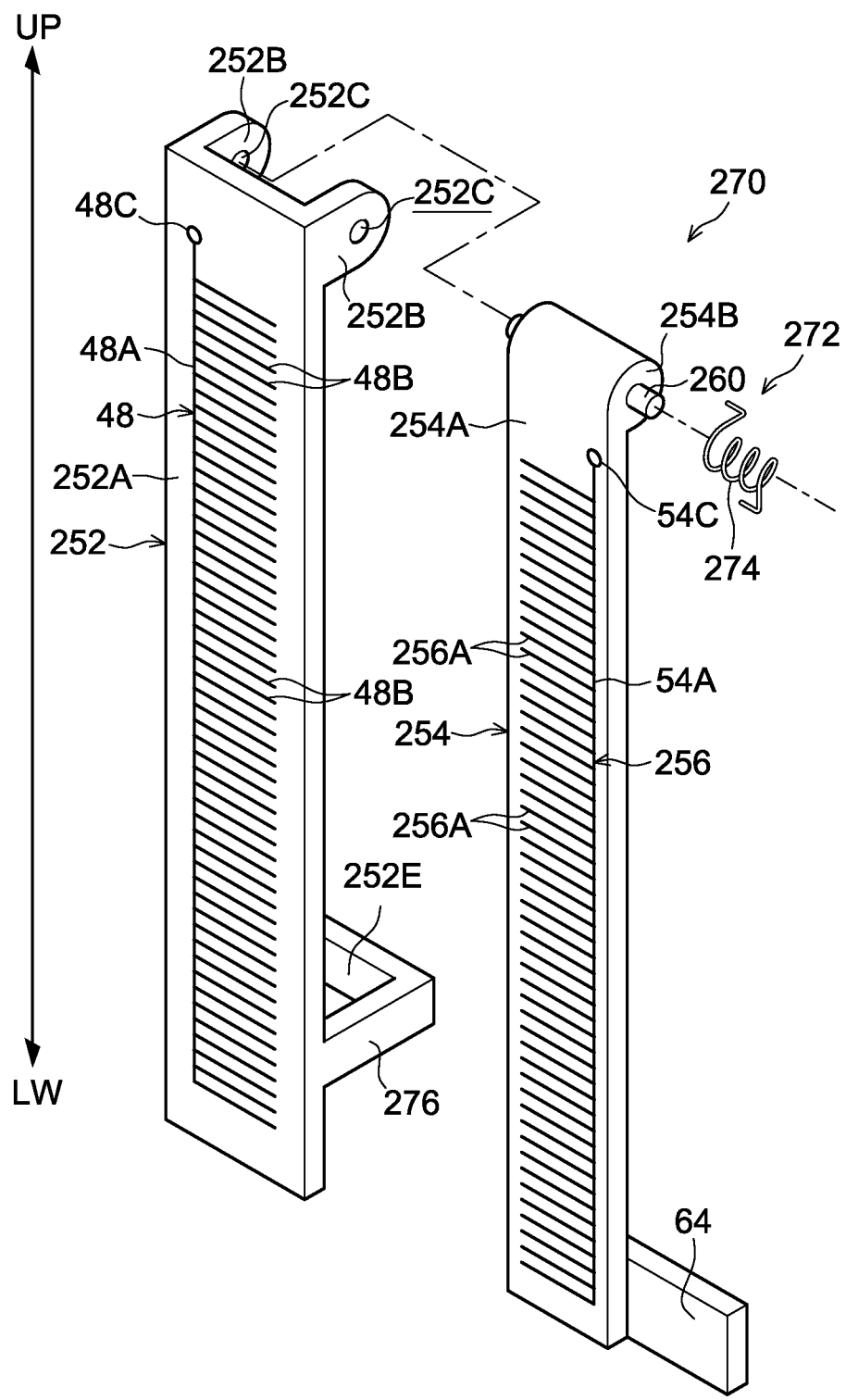
FIG. 25 is an exploded perspective view showing a liquid level detecting device of a tenth embodiment of the present invention.

At the first detection electrode 264A, the distance between, the electrode 48 and the electrode 256 (the distance in the direction perpendicular to the surface) is equal at the upper and lower sides, and therefore, an electrode pattern whose width in the lateral direction is equal is structured as shown in FIG. 23B. At the second detection electrode 264B, the distance between the electrode 48 and the electrode 256 becomes greater from the upper side toward the lower side, and an electrode pattern, whose width in the lateral direction becomes smaller from the upper side toward the lower side, is structured as shown in FIG. 24B. Note that the electrode patterns of the first detection electrode 264A and the second detection electrode 2648 may be changed depending on the sensitivity requirements of the liquid level detection of the fuel L.

In this liquid level detecting device 250, because the first detection electrode 264A and the second detection electrode 264B are structured from the common electrode plates 252, 254, there is no need to provide plural, independent detection electrodes.

Next, a tenth embodiment of the liquid level detecting device relating to the present invention is described by using FIG. 25 through FIG. 28. Note that the same structural portions as the above-described first through ninth embodiments are denoted by the same numbers, and description thereof is omitted.

As shown in FIG. 25 through FIG. 28, a driving structure 272, that serves as a variable structure and that changes the distance, in the direction perpendicular to the surface, between the electrode 48 of the one electrode plate 252 and the electrode 256 of the other electrode plate 254, is provided at a liquid level detecting device 270. The driving structure 272 has a torsion coil spring 274 that is attached to the rotating shaft 260 and serves as an example of an urging member that urges the other electrode plate 254 toward the position structuring the first detection electrode 264A (the side at which the other electrode plate 254 is closed), and the receiving surface 64 that is provided to project-out toward the side along the surface of the substrate 254A at the lower portion of the substrate 254A and receives the return fuel L that is ejected from the pipe 22 (see FIG. 1).

A guide 276, that has the opening portion 252E into which the electrode plate 254 is inserted, is provided at the substrate 232A of the electrode plate 252. The guide 276 has the function of a stopper that restricts the rotating range of the electrode plate 254.

Figure 26:
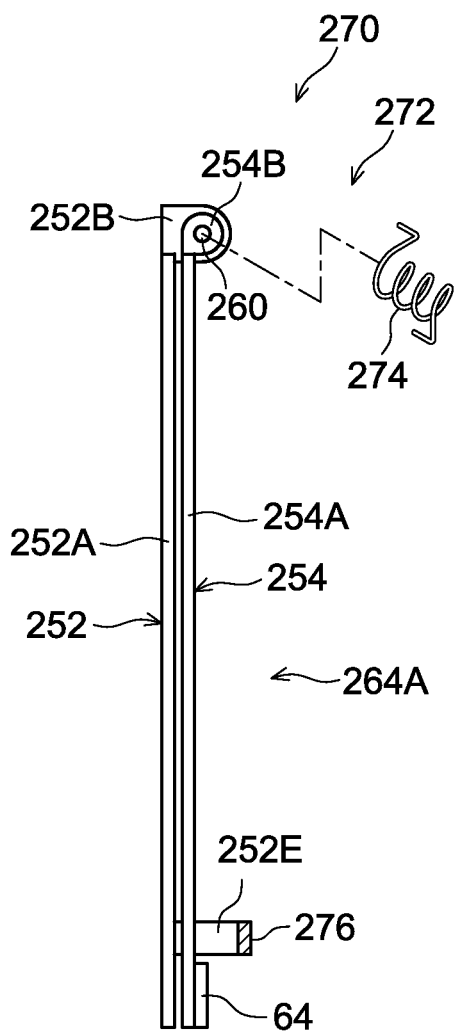
FIG. 26 is a side view showing a state in which a first detection electrode is structured by the liquid level detecting device shown in FIG. 25.
Figure 27:
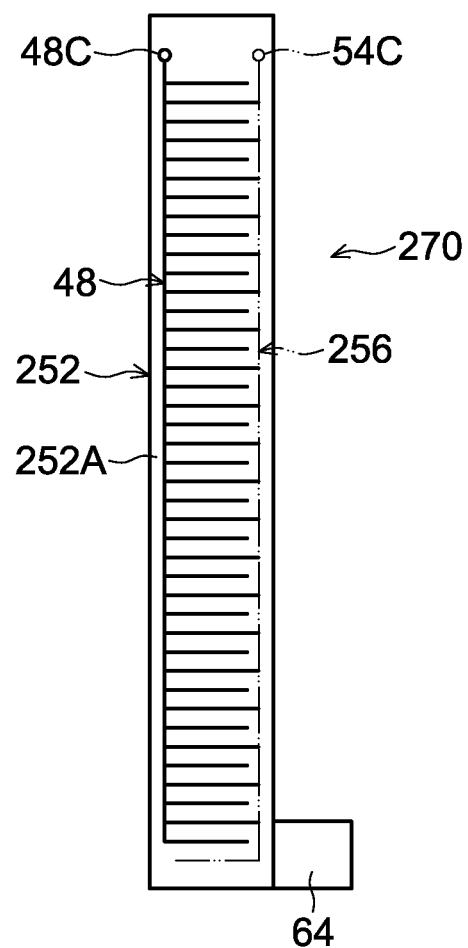
FIG. 27 is a front view showing the state in which the first detection electrode is structured by the liquid level detecting device shown in FIG. 25.
Figure 28:
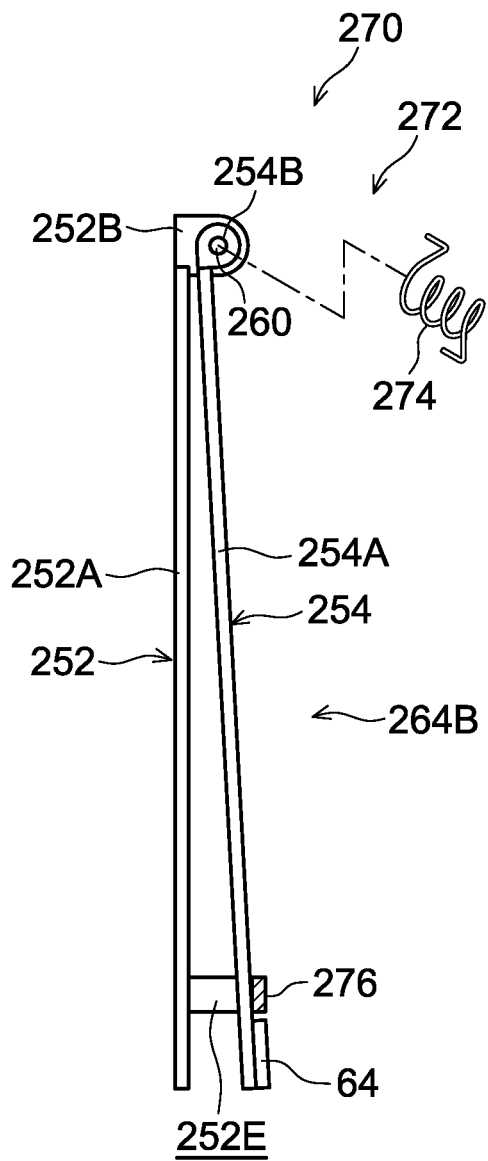
FIG. 28 is a side view showing a state in which a second detection electrode is structured by the liquid level detecting device shown in FIG. 25.

At this liquid, level detecting device 270, as shown in FIG. 26, due to the urging force of the torsion coil spring 274, the electrode plate 254 moves toward the closing side (the side approaching the electrode plate 252), and structures the first detection electrode 264A. As shown in FIG. 28, due to the receiving surface 64 receiving the return fuel L that is ejected from the pipe 22 (see FIG. 1), the electrode plate 254 rotates, around the rotating shaft 260 and against the urging force of the torsion coil spring 274, to the position structuring the second detection electrode 264B (the side at which the other electrode plate 254 is open). Due to the respective electrostatic capacitances being detected from the two patterns that are in accordance with the first detection electrode 264A and the second defection electrode 264B, and the electrostatic capacitance ratio being determined, the liquid level of the fuel L can be detected.

Note that, in the first through tenth embodiments, the variable structure that moves one electrode plate relatively with respect to the other electrode plate can be changed to various structures. For example, the variable structure may be a structure that moves one electrode plate relatively with respect to the other electrode plate by using a solenoid or an actuator or the like. Further, the variable structure may be a structure that moves one electrode plate relatively with respect to the other electrode plate by ejecting fuel by a jet pump that is disposed within the fuel tank.

Moreover, the first through tenth embodiments are structures that move one electrode plate with respect to the other electrode plate, but may be structures that move both of the pair of electrode plates and switch to the first detection electrode and the second detection electrode.

Note that the structural parts within the fuel tank 14 are not limited to the structural parts shown in FIG. 1 and the like, and can be changed. Further, the position of the liquid level detecting device within the fuel tank 14 also can be changed.

Further, the liquid is not limited to the fuel L, and the liquid level detecting device of the present invention can be applied also to cases of detecting liquid levels of other liquids.

The invention claimed is:

1. A liquid level detecting device comprising:
a pair of electrode plates that are disposed so as to oppose one another, and at which an electrostatic capacitance between the opposing portions is detected; and
a variable structure that can vary a surface area of an overlapping region of the pair of electrode plates or a distance between the pair of electrode plates, and that, by changing the surface area or the distance by a predetermined amount, switches between a first detection electrode and a second detection electrode that have different electrode patterns for detecting the electrostatic capacitance.

2. The liquid level detecting device of claim 1, wherein the variable structure has a driving structure that moves at least one of the pair of electrode plates relatively with respect to the other and switches between the first detection electrode and the second detection electrode.

3. The liquid level detecting device of claim 2, wherein the driving structure comprises:
an urging member that urges the pair of electrode plates toward a position that configures the first detection electrode; and
a liquid transporting mechanism that provides, to one of the pair of electrode plates, a flow of liquid, which moves the one of the pair of electrode plates against an urging force of the urging member.

4. The liquid level detecting device of claim 2, wherein the variable structure has a sliding structure that slides one of the pair of electrode plates with respect to the other along a surface direction of the pair of electrode plates.

5. The liquid level detecting device of claim 1, wherein the pair of electrode plates are plates made of metal.

6. A fuel tank structure comprising:
a fuel tank that accommodates fuel; and
the liquid level detecting device of claim 1, which is provided within the fuel tank and detects a liquid level of the fuel on the basis of at least an electrostatic capacitance detected at the first detection electrode and an electrostatic capacitance detected at the second detection electrode.

* * * * *